(12) United States Patent
Valentino et al.

(10) Patent No.: US 9,075,146 B1
(45) Date of Patent: Jul. 7, 2015

(54) WIRELESS, MOTION AND POSITION-SENSING, INTEGRATING RADIATION SENSOR FOR OCCUPATIONAL AND ENVIRONMENTAL DOSIMETRY

(71) Applicant: LANDAUER, INC., Glenwood, IL (US)

(72) Inventors: Daniel J. Valentino, Naperville, IL (US); James R. Thistlethwaite, III, Chicago, IL (US); R. Craig Yoder, Crown Point, IN (US)

(73) Assignee: LANDAUER, INC., Glenwood, IL (US)

( * ) Notice: Subject to any disclaimer, the term of this patent is extended or adjusted under 35 U.S.C. 154(b) by 0 days.

(21) Appl. No.: 14/269,226

(22) Filed: May 5, 2014

Related U.S. Application Data

(62) Division of application No. 13/906,553, filed on May 31, 2013, now Pat. No. 8,822,924.

(60) Provisional application No. 61/654,162, filed on Jun. 1, 2012.

(51) Int. Cl.
  *G01J 1/00* (2006.01)
  *G01T 7/00* (2006.01)
(52) U.S. Cl.
  CPC ........................................ *G01T 7/00* (2013.01)
(58) Field of Classification Search
  CPC .............. G01T 1/02; G01T 1/16; G01T 7/00; G01J 1/0488
  USPC ...................................................... 250/336.1
  See application file for complete search history.

(56) References Cited

U.S. PATENT DOCUMENTS

| 3,646,347 A | 2/1972 | Farmer et al. |
| 4,671,189 A | 6/1987 | David |

(Continued)

FOREIGN PATENT DOCUMENTS

| JP | 07311272 A | 11/1995 |
| JP | 2007205766 A | 8/2007 |

(Continued)

OTHER PUBLICATIONS

Examination Report received in related Great Britain Application No. GB 1420470.5, mailed Dec. 24, 2014.

(Continued)

*Primary Examiner* — Kiho Kim
(74) *Attorney, Agent, or Firm* — Alchemy-Partners, PC

(57) ABSTRACT

Described is a radiation dosimeter including multiple sensor devices (including one or more passive integrating electronic radiation sensor, a MEMS accelerometers, a wireless transmitters and, optionally, a GPS, a thermistor, or other chemical, biological or EMF sensors) and a computer program for the simultaneous detection and wireless transmission of ionizing radiation, motion and global position for use in occupational and environmental dosimetry. The described dosimeter utilizes new processes and algorithms to create a self-contained, passive, integrating dosimeter. Furthermore, disclosed embodiments provide the use of MEMS and nano-technology manufacturing techniques to encapsulate individual ionizing radiation sensor elements within a radiation attenuating material that provides a "filtration bubble" around the sensor element, the use of multiple attenuating materials (filters) around multiple sensor elements, and the use of a software algorithm to discriminate between different types of ionizing radiation and different radiation energy.

34 Claims, 10 Drawing Sheets

(56) References Cited

U.S. PATENT DOCUMENTS

| | | | |
|---|---|---|---|
| 5,731,590 | A | 3/1998 | Miller |
| 5,739,541 | A | 4/1998 | Kahilainen |
| 5,892,234 | A | 4/1999 | McKeever et al. |
| 5,962,857 | A | 10/1999 | McKeever et al. |
| 6,127,685 | A | 10/2000 | Yoder et al. |
| 6,172,368 | B1 | 1/2001 | Tarr et al. |
| 6,198,108 | B1 | 3/2001 | Schweitzer et al. |
| 6,604,711 | B1 | 8/2003 | Stevens et al. |
| 6,846,434 | B2 | 1/2005 | Akselrod |
| 7,098,470 | B2 | 8/2006 | Akselrod et al. |
| 7,865,277 | B1 | 1/2011 | Larson et al. |
| 7,964,851 | B2 | 6/2011 | Fehrenbacher |
| 2003/0031298 | A1 | 2/2003 | Xing |
| 2004/0021087 | A1 | 2/2004 | Tokhtuev et al. |
| 2006/0043304 | A1 | 3/2006 | Miller et al. |
| 2006/0185434 | A1 | 8/2006 | Bernhagen |
| 2008/0217551 | A1 | 9/2008 | Zhang et al. |
| 2009/0010390 | A1 | 1/2009 | Saoudi et al. |
| 2009/0020703 | A1 | 1/2009 | Buckley et al. |
| 2009/0102296 | A1 | 4/2009 | Greene et al. |
| 2009/0235439 | A1* | 9/2009 | Cox et al. .......... 2/457 |
| 2009/0317002 | A1* | 12/2009 | Dein .............. 382/224 |
| 2010/0072380 | A1* | 3/2010 | Britton et al. ........ 250/370.07 |
| 2010/0315203 | A1 | 12/2010 | Larson et al. |
| 2012/0041685 | A1 | 2/2012 | Ding et al. |
| 2012/0132806 | A1 | 5/2012 | Findlay et al. |

FOREIGN PATENT DOCUMENTS

| | | | |
|---|---|---|---|
| KR | 20040019525 | A | 3/2004 |
| KR | 1020040019525 | A | 3/2004 |
| WO | 2013066882 | A1 | 5/2013 |

OTHER PUBLICATIONS

International Search Report dated Sep. 18, 2014 in corresponding International Application No. PCT/IB2014/061818.

International Search Report dated Sep. 25, 2014 in corresponding International Application No. PCT/IB2014/061822.

International Search Report and Written Opinion dated Oct. 28, 2013 in corresponding International Application No. PCT/IB2013/054517.

Botter-Jensen, L., et al., "Optically Stimulated Luminescence Dosimetry," Elsevier, 2003.

Klemic, G., et al., "External Dosimetry in the Aftermath of a Radiological Terrorist Event," Radiation Protection Dosimetry, vol. 120, No. 1-4, pp. 242-249, 2006.

Akselrod, M.S., et al., "Preparation and Properties of Al2O3:C," Radiation Protection Dosimetry, vol. 47, No. 1-4, pp. 159-164, 1993.

Akselrod, M.S., et al., "Optically Stimulated Luminescence of Al2O3," Radiation Measurements, vol. 29, No. 3-4, pp. 391-399, 1998.

International Search Report dated Sep. 18, 2014 in corresponding International Application No. PCT/IB2014/061819.

International Preliminary Report on Patentability received in PCT Application No. PCT/IB2013/054517 mailed Dec. 2, 2014.

* cited by examiner

Table 1: MATRIX Computational Procedure.

| STEP | PROCEDURE |
|---|---|
| 1 | INPUT the Dosimeter Element Responses and the Dosimeter Response Matrix for the corresponding Dosimeter Type, and then calculate the Converted Values from disk to memory |
| 2 | Check for Error Conditions |
| 3 | Calculate does values for each source in the Response Matrix |
| 4 | Calculate total reportable doses |
| 5 | Estimate most likely source |
| 6 | Calculate Final (Net) Dose |
| 7 | OUTPUT Net Dose from memory disk |

FIG. 9

WIRELESS, MOTION AND POSITION-SENSING, INTEGRATING RADIATION SENSOR FOR OCCUPATIONAL AND ENVIRONMENTAL DOSIMETRY

CROSS-REFERENCE TO RELATED APPLICATIONS

This application is a divisional application of U.S. patent application Ser. No. 13/906,553 to Valentino et al., entitled "WIRELESS, MOTION AND POSITION-SENSING, INTEGRATING RADIATION SENSOR FOR OCCUPATIONAL AND ENVIRONMENTAL DOSIMETRY", filed May 31, 2013, which in turn claims benefit of priority to U.S. Provisional Patent Application No. 61/654,162 to Valentino et al., entitled "WIRELESS, MOTION AND POSITION-SENSING INTEGRATING RADIATION SENSOR FOR OCCUPATIONAL AND ENVIRONMENTAL DOSIMETRY", filed Jun. 1, 2012, the entire contents and disclosures of which are incorporated herein by reference.

BACKGROUND

1. Field of the Invention

The present invention relates to detection systems and networks of detectors and, particularly, to the design of a sensor system capable of detecting and quantifying a measurable event, such as an exposure to ionizing radiation, by recording the time, location, ambient temperature, motion and intensity of the event; accurately calculating the equivalent absorbed dose due to the radiation event; mapping the distribution of events by using data collected from a large number of sensor systems over a wireless network; and predicting the probable severity of the event by analysis of the collected sensor network data.

2. Background of the Invention

Occupational radiation exposure events can occur in healthcare, the oil and gas industry, the military and other industrial settings where the use of materials or devices that emit ionizing radiation can result in accidental or occupationally unavoidable exposure events.

Emergency radiation exposure events can occur when a Radiological Dispersal Device (RDD), Improvised Nuclear Device (IND), or another source of radioactive material is released and contaminates a given area.

Radiation dosimetry programs have been developed to monitor and protect workers who might be exposed to radiation. The personal dose equivalent, measured using a radiation dosimeter, is commonly used to monitor radiation dose to an individual. The accurate and reliable measurement of the personal dose equivalent from a radiation exposure event is a key component of radiation dosimetry. The personal dose equivalent is typically measured over a wide range of energies and from different radiation sources, which might include x-rays, gamma rays, alpha particles, beta particles and neutrons. In order to accurately estimate the dose from different radiation sources, many personal dosimeters incorporate an array of detector elements, each with varying types of radiation filtration materials, and use a dose calculation algorithm to accurately calculate the personal dose equivalent from a numerical combination of the responses from each detector element.

More recently, emergency management plans have been developed to enable the safe and timely response to emergency radiation events. An important aspect of any emergency management plan following a radiation event is to ensure the safety of fire, police and other emergency response personnel ("First Responders"), health-care workers, and citizens that might be exposed to radiation resulting from the radiological or nuclear device. Radiation exposure of first responders and health-care workers is often, at least partially, monitored using traditional radiation detecting devices, however, monitoring the exposure of potentially tens of thousands of citizens presents a more difficult problem.

Furthermore, after removable contamination has been eliminated, there may be a need for external personal dosimetry monitoring for individual members of the public as well as large numbers of workers. Site restoration could be a lengthy project and, to minimize disruption to society, it may be necessary to allow inhabitants to have access to certain areas before cleanup is complete. For example, allowing citizens to pass through transit centers, thoroughfares, or certain areas of buildings would facilitate government operations, commerce, uniting of families, routine medical treatments, etc. As an individual moves through a contaminated area, it would be valuable to know the dose and time of exposure at each location visited. Such dose measurements could reduce reliance on model-based estimates of dose, and avoid unnecessary area restrictions by providing a geographic map of the dynamic dose distribution reconstructed from a large number of dosimeters collecting dose event data over the potentially still-contaminated area. Unlike cleanup at decommissioned facilities where the public could be excluded with little cost to society, in an urban environment, time is of the essence and the cost of exclusion may be greater than the benefit avoiding exposure to a relatively low radiation dose. After cleanup, personal dosimetry could boost public confidence that their personal dose is below acceptable thresholds, and that the final cleanup was effective.

In the case of radiation events, several radiation measurement technologies currently exist including TLD dosimeters, OSL dosimeters, electronic dosimeters, quartz or carbon fiber electrets, and other solid-state radiation measurement devices.

Thermoluminescent Dosimeter (TLD) badges are personal monitoring devices using a special material (i.e. lithium fluoride) that retains deposited energy from radiation. TLD badges are read using heat, which causes the TLD material to emit light that is detected by a TLD reader (calibrated to provide a proportional electric current). Significant disadvantages of TLD badges are that the signal of the device is erased or zeroed out during read-out, substantial time is required to obtain the reading, and the dosimeters must be returned to a processing laboratory for readout.

Optically Stimulated Luminescence (OSL) badges use an optically stimulated luminescent material (OSLM) (i.e., aluminum oxide) to retain radiation energy. Tiny crystal traps within the OSL material trap and store energy from radiation exposure. The amount of exposure is determined by illuminating the crystal traps with a stimulating light of one color (i.e., green) and measuring the amount of emitted light of another color (i.e., blue). Alternatively, pulsed light stimulation can be used to differentiate between the stimulation and emission light [e.g., see U.S. Pat. Nos. 5,892,234 and 5,962,857. Unlike TLD systems. OSL systems provide a readout in only a few seconds and, because only a very small fraction of the exposure signal is depleted during readout, the dosimeters can be readout multiple times. OSL dosimeters can be read in the field using small, field-transportable readers, however, the readers are still too large, slow and expensive to allow individual, real-time readings in the field. In currently-existing OSL dosimetry programs for reporting the dose of record, the dosimeters must be returned to a processing laboratory for readout.

Optically Stimulated Luminescence (OSL) badges use an optically stimulated luminescent material (OSLM) (i.e., aluminum oxide) to retain radiation energy. Tiny crystal traps within the OSL material trap and store energy from radiation exposure. The amount of exposure is determined by illuminating the crystal traps with a stimulating light of one color (i.e., green) and measuring the amount of emitted light of another color (i.e., blue). Alternatively, pulsed light stimulation can be used to differentiate between the stimulation and emission light [e.g., see U.S. Pat. Nos. 5,892,234 and 5,962,857. Unlike TLD systems. OSL systems provide a readout in only a few seconds and, because only a very small fraction of the exposure signal is depleted during readout, the dosimeters can be readout multiple times. OSL dosimeters can be read in the field using small, field-transportable readers, however, the readers are still too large, slow and expensive to allow individual, real-time readings in the field. In currently-existing OSL dosimetry programs for reporting the dose of record, the dosimeters must be returned to a processing laboratory for readout. For more information on OSL materials and systems, see. U.S. Pat. No. 5,731,590 issued to Miller; U.S. Pat. No. 6,846,434 issued to Akselrod; U.S. Pat. No. 6,198,108 issued to Schwietzer et al.; U.S. Pat. No. 6,127,685 issued to Yoder et al.; U.S. patent application Ser. No. 10/768,094 filed by Akselrod et al.; all of which are hereby incorporated by reference in their entireties. See also, Optically Stimulated Luminescence Dosimetry, Lars Botter-Jensen et al., Elesevier, 2003; Klemic, G., Bailey, P., Miller, K., Monetti, M. External radiation dosimetry in the aftermath of radiological terrorist event, Rad. Prot. Dosim, in press; Akslerod, M. S., Kortov, V. S., and Gorelova. E. A., Preparation and properties of $Al_2O_3$:C. Radiat. Prot Dosim 47, 159-164 (1993); and Akselrod, M. S., Lucas, A. C., Polf, J. C., McKeever, S. W. S. Optically stimulated luminescence of $Al_2O_3$:C. Radiation Measurements. 29, (3-4). 391-399 (1998), all of which are incorporated by reference in their entireties.

Solid State Sensors use solid-phase materials such as semiconductors to quantify radiation interaction through the collection of charge in the semiconductor media. As the radiation particle travels through the semiconductor media electron-hole pairs are generated along the particle path. The motion of the electron-hole pair in an applied electric field generates the basic electrical signal from the detector. There are two main categories of solid state sensors, active and passive. Active sensors often use a semiconductor that is biased by an externally powered electric field that requires constant power. The active sensors generate electric pulses for each radioactive particle striking the sensor. These pulses must be continuously counted to record the correct radiation dose. A loss of power means no dose is measured. Active solid state sensors are typically made from silicon and other semiconductors. Passive solid state sensors utilize an on device charged medium that maintains the electric field necessary to separate the electron-hole pairs without drawing external power. Passive solid state dosimeters often use what is called a floating gate where the gate is embedded within the detection medium so it electronically isolated. The floating gate is charged and provides the electric field for charge separation. See U.S. Pat. No. 6,172,368 issued to Tarr. The medium above the floating gate is typically an insulator such as silicon oxide however it can also be a sealed gas chamber. See U.S. Pat. No. 5,739,541 issued to Kahilainen. Passive Solid state electronic detectors offer a means of monitoring radiation that are compatible the present invention.

Electronic dosimeters are battery powered, and typically incorporate a digital display or other visual, audio or vibration alarming capability. These instruments often provide real-time dose rate information to the wearer. For routine occupational radiation settings in the U.S. electronic dosimeters are mostly, but not strictly, used for access control and not for dose of record. A number of cities and states issue electronic dosimeters to HAZMAT teams as part of their emergency response plans. There are presently tens of thousands of electronic dosimeters deployed, for example, for homeland security purposes, however, electronic dosimeters are impractical for widespread use dosimetersdue to their high cost.

Quartz or carbon fiber electrets are cylindrical electroscopes where the dose is read by holding it up to the light and viewing the location of the fiber on a scale through an eyepiece at one end. A manually powered charger is needed to zero the dosimeter. The quartz fiber electret is an important element of many state emergency plans. For example, some plans call for emergency responders to be issued a quartz fiber electret along with a card for recording the reading every 30 minutes, as well as a cumulative dosimetry badge or wallet card. While they are specified for use in nuclear power plant emergencies, the NRC does not require them to be NVLAP accredited, only that they be calibrated periodically.

Existing passive personal radiation monitoring devices do not provide immediate access to recorded dose measurements, while active devices typically consume sufficient power to require regular recharging. No existing devices measure the complete "radiation event."

In general, a need exists for "event detection" devices, e.g., radiation dosimeters or other detection devices, with the following characteristics: (1) small and easily carried or mounted to fixed structures or mobile transports; (2) capable of measuring a dose event, including the measured amplitude or intensity of the event, time of the event, location of the event, ambient temperature, motion of the detector and proximity to other detectors; (3) accurate calculation of the dose, e.g., the Personal Dose Equivalent, over a wide dose range, wide energy range, and large angles of incidence; (4) ability to display the measured dose event on the detector, or using a personal mobile device, in order to alert the User to anomalous events, and in order to transmit the measured dose over private and public networks to a dose event repository; (5) ability to track and report dose events in the field over extended periods of time without replacing or externally charging the power source; (6) ability to map the distribution of dose over a geographic area, to identify anomalous dose distributions, to dynamically track sources and to alert Authorized Personnel of anomalous dose events.

SUMMARY

According to a first broad aspect, the present invention provides a device comprising a radiation sensor array comprising one or more radiation sensors mounted on a printed circuit board (PCB), wherein the one or more radiation sensors are surrounded by a filter material to provide an optimal angular response.

According to a second broad aspect, the present invention provides an integrated sensor module comprising a radiation sensor array, an on-board motion sensor, an on-board geospatial positioning sensor, an on-board power harvester, an on-board wireless transmitter, and an on-board temperature sensor.

According to a third broad aspect, the present invention provides an integrated sensor module comprising a radiation sensor array, an on-board motion sensor, an on-board geospatial positioning sensor, an on-board power harvester, an on-board wireless transmitter and an on-board temperature sensor.

According to a fourth broad aspect, the present invention provides an an autonomous mobile sensor network for tracking a position and distribution of materials comprising an integrated sensor module comprising a radiation sensor array, an on-board motion sensor, an on-board geospatial positioning sensor, an on-board power harvester, an on-board wireless transmitter, and an on-board temperature sensor. The autonomous mobile sensor network may also include a communication device, a wireless network, a public data network, and a remote data server, wherein the communication device is configured to communicate with the integrated sensor module and the wireless network; wherein the wireless network is also configured to communicate with the public data network; and wherein the public data network is also configured to communicate with the remote data server.

According to a fifth broad aspect, the present invention provides an autonomous mobile wireless sensor base station network for tracking a position and distribution of materials comprising an integrated sensor module comprising a radiation sensor array, an on-board motion sensor, an on-board geospatial positioning sensor, an on-board power harvester, an on-board wireless transmitter and an on-board temperature sensor. The autonomous mobile wireless sensor base station network a wireless sensor base station, a wireless network, a public data network and a distributed data server, wherein the wireless sensor base station is configured to communicate with the integrated sensor module and the wireless network; wherein the wireless network is also configured to communicate with the public data network; and wherein the public data network is also configured to communicate with the distributed data server.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 9 illustrates a computational procedure according to an exemplary embodiment of the present invention;

DETAILED DESCRIPTION OF THE PREFERRED EMBODIMENTS

Definitions

Figure 1:
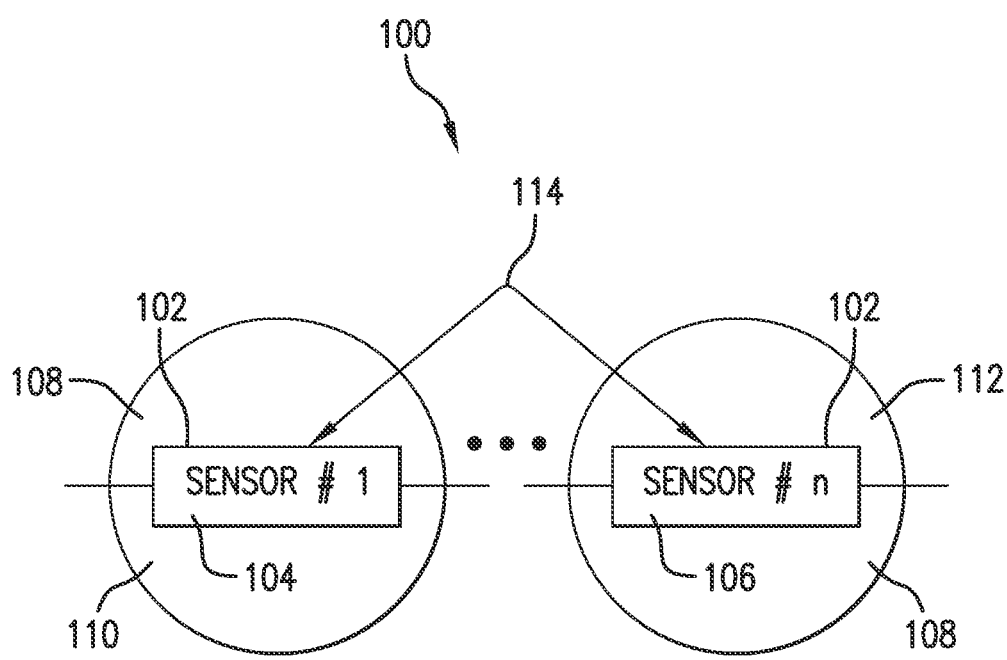
FIG. 1 illustrates a split sphere encapsulating "filtration bubble" for a plurality of ionizing radiation sensors according to an exemplary embodiment of the present invention.

Where the definition of terms departs from the commonly used meaning of the term, applicant intends to utilize the definitions provided below, unless specifically indicated.

For the purposes of the present invention, directional terms such as "top", "bottom", "upper", "lower". "above", "below", "left". "right", "horizontal", "vertical", "upward", "downward", etc., are merely used for convenience in describing the various embodiments of the present invention.

For the purposes of the present invention, the term "accelerometer" refers to an electromechanical device for measuring acceleration forces including static or dynamic forces. An accelerometer measures proper acceleration, which is the acceleration it experiences relative to free fall and is the acceleration felt by people and objects. Put another way, at any point in space time the equivalence principle guarantees the existence of a local inertial frame, and an accelerometer measures the acceleration relative to that frame.[1] Such accelerations are popularly measured in terms of g-force. Single- and multi-axis models of accelerometer are available to detect magnitude and direction of the proper acceleration (or g-force), as a vector quantity, and can be used to sense orientation (because direction of weight changes), coordinate acceleration (so long as it produces g-force or a change in g-force), vibration, shock, and falling in a resistive medium (a case where the proper acceleration changes, since it starts at zero, then increases). Micro-machined accelerometers are increasingly present in portable electronic devices and video game controllers, to detect the position of the device or provide for game input. Pairs of accelerometers extended over a region of space can be used to detect differences (gradients) in the proper accelerations of frames of references associated with those points. These devices are called gravity gradiometers, as they measure gradients in the gravitational field. Such pairs of accelerometers in theory may also be able to detect gravitational waves.

For the purposes of the present invention, the term "angle of incidence" refers to the angle between the direction of the radiation trajectory and a line perpendicular (normal) to the detector surface.

For the purposes of the present invention, the term "autonomous mobile sensor (AMS) network" refers a network of independently functioning mobile sensors, each capable of moving in response to the intensity of the detected event and their proximity to the other mobile sensors, such that the group of mobile sensors automatically follows the dynamic distribution of the tracked entity as the intensity changes over time or distributes over a geographic region or within a building or structure.

For the purposes of the present invention, the term "ANT" or "ANT+' refers to a proprietary wireless sensor network technology featuring a wireless communications protocol stack that enables semiconductor radios operating in the 2.4 GHz industrial, scientific, and medical allocation of the RF spectrum ("ISM band") to communicate by establishing standard rules for co-existence, data representation, signaling, authentication, and error detection. ANT is characterized by a low computational overhead and low to medium efficiency, resulting in low power consumption by the radios supporting the protocol.

For the purposes of the present invention, the term "Bluetooth®" refers to a wireless technology standard for exchanging data over short distances (using short-wavelength radio transmissions in the ISM band from 2400-2480 MHz) from fixed and mobile devices, creating personal area networks (PANs) with high levels of security. Created by telecom vendor Ericsson in 1994, it was originally conceived as a wireless alternative to RS-232 data cables. It can connect several devices, overcoming problems of synchronization. Bluetooth®, is managed by the Bluetooth® Special Interest Group, which has more than 18,000 member companies in the areas of telecommunication, computing, networking, and consumer electronics. Bluetooth® was standardized as IEEE 802.15.1, but the standard is no longer maintained. The SIG oversees the development of the specification. manages the qualification program, and protects the trademarks. To be marketed as a Bluetooth® device, it must be qualified to standards defined by the SIG. A network of patents is required to implement the technology and are licensed only for those qualifying devices.

For the purposes of the present invention, the term a "chemical sensor" refers to a device that measures the presence, concentration or absolute quantity of a given chemical entity, such as an element or molecule, in either a gas, liquid or solid phase.

For the purposes of the present invention, the term "cloud computing" is synonymous with computing performed by computers that are located remotely and accessed via the Internet (the "Cloud"). It is a style of computing where the computing resources are provided "as a service", allowing users to access technology-enabled services "in the cloud" without knowledge of, expertise with, or control over the technology infrastructure that supports them. According to the IEEE Computer Society it "is a paradigm in which information is permanently stored in servers on the Internet and cached temporarily on clients that include desktops, entertainment centers, table computers, notebooks, wall computers, handhelds, etc." Cloud computing is a general concept that incorporates virtualized storage, computing and web services and, often, software as a service (SaaS), where the common theme is reliance on the Internet for satisfying the computing needs of the users. For example, Google Apps provides common business applications online that are accessed from a web browser, while the software and data are stored on the servers. Some successful cloud architectures may have little or no established infrastructure or billing systems whatsoever including Peer-to-peer networks like BitTorrent and Skype and volunteer computing like SETI@home. The majority of cloud computing infrastructure currently consists of reliable services delivered through next-generation data centers that are built on computer and storage virtualization technologies. The services may be accessible anywhere in the world, with the Cloud appearing as a single point of access for all the computing needs of data consumers. Commercial offerings may need to meet the quality of service requirements of customers and may offer service level agreements. Open standards and open source software are also critical to the growth of cloud computing. As customers generally do not own the infrastructure, they are merely accessing or renting, they may forego capital expenditure and consume resources as a service, paying instead for what they use. Many cloud computing offerings have adopted the utility computing model which is analogous to how traditional utilities like electricity are consumed, while others are billed on a subscription basis. By sharing "perishable and intangible" computing power between multiple tenants, utilization rates may be improved (as servers are not left idle) which can reduce costs significantly while increasing the speed of application development. A side effect of this approach is that "computer capacity rises dramatically" as customers may not have to engineer for peak loads. Adoption has been enabled by "increased high-speed bandwidth" which makes it possible to receive the same response times from centralized infrastructure at other sites.

For the purposes of the present invention, the term "computer" refers to a machine that manipulates data according to a sequence of instructions stored on a machine readable medium. A computer may include one or more processors that that execute such a sequence of instructions to cause one or more electronic devices, often including the computer itself, to perform a set of operations. Personal computers, in various forms, are icons of the Information Age and are what most people think of as a "computer"; however, the most common form of computer in use today is the embedded computer. Embedded computers are small, simple devices that are used to control other devices—for example, they may be found in machines ranging from fighter aircraft to industrial robots, digital cameras, and children's toys. The ability to store and execute lists of instructions called programs makes computers extremely versatile and distinguishes them from calculators. The Church-Turing thesis is a mathematical statement of this versatility: any computer with a certain minimum capability is, in principle, capable of performing the same tasks that any other computer can perform. Therefore, computers with capability and complexity ranging from that of a personal digital assistant to a supercomputer are all able to perform the same computational tasks given enough time and storage capacity. Computers are indispensable for the analysis of large amounts of data, for tasks that require complex computation, or for the extraction of quantitative information.

For the purposes of the present invention, the term "computer hardware" is the digital circuitry and physical devices of a computer system, as opposed to computer software, which is stored on a hardware device such as a hard disk. Most computer hardware is not seen by normal users, because it is embedded within a variety of every day systems, such as in automobiles, microwave ovens, electrocardiograph machines, compact disc players, and video games, among many others. A typical personal computer consists of a case or chassis in a tower shape (desktop) and the following parts: motherboard, CPU, RAM, firmware, internal buses (PIC, PCI-E, USB. HyperTransport, CSI. AGP. VLB), external bus controllers (parallel port, serial port, USB, Firewire, SCSI. PS/2, ISA, EISA, MCA), power supply, case control with cooling fan, storage controllers (CD-ROM, DVD, DVD-ROM, DVD Writer, DVD RAM Drive, Blu-ray. BD-ROM, BD Writer, floppy disk, USB Flash, tape drives, SATA. SAS), video controller, sound card, network controllers (modem, NIC), and peripherals, including mice, keyboards, pointing devices, gaming devices, scanner, webcam, audio devices, printers, monitors, etc.

For the purposes of the present invention, the term "computer network" refers to a group of interconnected computers. Networks may be classified according to a wide variety of characteristics. The most common types of computer networks in order of scale include: Personal Area Network (PAN), Local Area Network (LAN), Campus Area Network (CAN), Metropolitan Area Network (MAN), Wide Area Network (WAN), Global Area Network (GAN), Internetwork (intranet, extranet, Internet), and various types of wireless networks. All networks are made up of basic hardware building blocks to interconnect network nodes, such as Network Interface Cards (NICs), Bridges, Hubs, Switches, and Routers. In addition, some method of connecting these building blocks is required, usually in the form of galvanic cable (most commonly category 5 cable). Less common are microwave links (as in IEEE 802.11) or optical cable ("optical fiber").

For the purposes of the present invention, the term "computer software" refers to a general term used to describe a collection of computer programs, procedures and documentation that perform some tasks on a computer system. The term includes application software such as word processors which perform productive tasks for users, system software such as operating systems, which interface with hardware to provide the necessary services for application software, and middleware which controls and co-ordinates distributed systems. Software may include websites, programs, video games, etc. that are coded by programming languages like C, C++, Java, etc. Computer software is usually regarded as anything but hardware, meaning the "hard" are the parts that are tangible (able to hold) while the "soft" part is the intangible objects inside the computer. Computer software is so called to distinguish it from computer hardware, which encompasses the physical interconnections and devices required to store and execute (or run) the software. At the lowest level, software consists of a machine language specific to an individual processor. A machine language consists of groups of binary values signifying processor instructions which change the state of the computer from its preceding state.

For the purposes of the present invention, the term "computer system" refers to any type of computer system that implements software including an individual computer such as a personal computer, mainframe computer, mini-computer, etc. In addition, computer system refers to any type of network of computers, such as a network of computers in a business, the Internet, personal data assistant (PDA), devices such as a cell phone, a television, a videogame console, a compressed audio or video player such as an MP3 player, a DVD player, a microwave oven, etc. A personal computer is one type of computer system that typically includes the following components: a case or chassis in a tower shape (desktop) and the following parts: motherboard, CPU, RAM, firmware, internal buses (PIC. PCI-E, USB, HyperTransport, CSI. AGP, VLB), external bus controllers (parallel port, serial port, USB, Firewire, SCSI. PS/2, ISA. EISA, MCA), power supply, case control with cooling fan, storage controllers (CD-ROM, DVD, DVD-ROM, DVD Writer, DVD RAM Drive, Blu-ray, BD-ROM, BD Writer, floppy disk, USB Flash, tape drives, SATA, SAS), video controller, sound card, network controllers (modem, NIC), and peripherals, including mice, keyboards, pointing devices, gaming devices, scanner, webcam, audio devices, printers, monitors, etc.

For the purposes of the present invention, the term "data" means the reinterpretable representation of information in a formalized manner suitable for communication, interpretation, or processing. Although one type of common type data is a computer file, data may also be streaming data, a web service, etc. The term "data" is used to refer to one or more pieces of data.

For the purposes of the present invention, the term "database" or "data record" refers to a structured collection of records or data that is stored in a computer system. The structure is achieved by organizing the data according to a database model. The model in most common use today is the relational model. Other models such as the hierarchical model and the network model use a more explicit representation of relationchips (see below for explanation of the various database models). A computer database relies upon software to organize the storage of data. This software is known as a database management system (DBMS). Database management systems are categorized according to the database model that they support. The model tends to determine the query languages that are available to access the database. A great deal of the internal engineering of a DBMS, however, is independent of the data model, and is concerned with managing factors such as performance, concurrency, integrity, and recovery from hardware failures. In these areas there are large differences between products.

For the purposes of the present invention, the term "database management system (DBMS)" represents computer software designed for the purpose of managing databases based on a variety of data models. A DBMS is a set of software programs that controls the organization, storage, management, and retrieval of data in a database. DBMS are categorized according to their data structures or types. It is a set of prewritten programs that are used to store, update and retrieve a Database.

For the purposes of the present invention, the term "data storage medium" or "data storage device" refers to any medium or media on which a data may be stored for use by a computer system. Examples of data storage media include floppy disks. Zip™ disks, CD-ROM. CD-R, CD-RW, DVD, DVD-R, memory sticks, flash memory, hard disks, solid state disks, optical disks, etc. Two or more data storage media acting similarly to a single data storage medium may be referred to as a "data storage medium" for the purposes of the present invention.

For the purposes of the present invention, the term "dosimeter" refers to a device for measuring an individual's or an object's exposure to something in the environment—particularly to a hazard inflicting cumulative impact over long periods of time, or over a lifetime. This article concentrates on the radiation dosimeter, which measures exposure to ionizing radiation. The radiation dosimeter is of fundamental importance in the disciplines of radiation dosimetry and health physics. Other types of dosimeters are sound dosimeters, ultraviolet dosimeters and electromagnetic field dosimeters. Ionizing radiation, such as X-rays, alpha rays, beta rays . . . and gamma rays, are undetectable by the human senses, therefore a measuring device, such as a dosimeter, is used to detect, measure and record this, and in some cases give an alarm when a preset level is exceeded. Ionizing radiation damage to the body is cumulative, and is related to the total dose received, for which the SI unit is the sievert. Therefore, workers exposed to radiation, such as radiographers, nuclear power plant workers, doctors using radiotherapy, those in laboratories using radionuclides, and some HAZMAT teams are required to wear dosimeters so their employers can keep a record of their exposure to verify that it is below legally prescribed limits. Such devices may be recognized as "legal dosimeters," meaning that they have been approved for use in recording personnel dose for regulatory purposes.

For the purposes of the present invention, the term "energy compensating material" refers to a material that when placed between an OSLM and a source of gamma radiation or x-ray radiation alters the response over a range of gamma energies or x-ray energies compared to the OSLM exposed with no compensating or filtering material. Examples of energy compensating materials are copper and aluminum.

For the purposes of the present invention, the term "flocking-algorithm" refers to an computational procedure that allows a network of mobile sensors to move as a function of each sensor's proximity to other mobile sensors as well as the intensity or amplitude of a measured event, such that the network of mobile sensors moves autonomously in a concerted, self-organized fashion that tracks the dynamic motion and distribution of the measured event.

For the purposes of the present invention, the term "Internet" is a global system of interconnected computer networks that interchange data by packet switching using the standardized Internet Protocol Suite (TCP/IP). It is a "network of networks" that consists of millions of private and public, academic, business, and government networks of local to global scope that are linked by copper wires, fiber-optic cables, wireless connections, and other technologies. The Internet carries various information resources and services, such as electronic mail, online chat, file transfer and file sharing, online gaming, and the inter-linked hypertext documents and other resources of the World Wide Web (WWW).

For the purposes of the present invention, the term "Internet protocol (IP)" refers to a protocol used for communicating data across a packet-switched internetwork using the Internet Protocol Suite (TCP/IP). IP is the primary protocol in the Internet Layer of the Internet Protocol Suite and has the task of delivering datagrams (packets) from the source host to the destination host solely based on its address. For this purpose the Internet Protocol defines addressing methods and structures for datagram encapsulation. The first major version of addressing structure, now referred to as Internet Protocol Version 4 (Ipv4) is still the dominant protocol of the Internet, although the successor. Internet Protocol Version 6 (Ipv6) is actively deployed world-wide. In one embodiment, an EGI-SOA of the present invention may be specifically designed to seamlessly implement both of these protocols.

For the purposes of the present invention, the term "intranet" refers to a set of networks, using the Internet Protocol and IP-based tools such as web browsers and file transfer applications that are under the control of a single administrative entity. That administrative entity closes the intranet to all but specific, authorized users. Most commonly, an intranet is the internal network of an organization. A large intranet will typically have at least one web server to provide users with organizational information. Intranets may or may not have connections to the Internet. If connected to the Internet, the intranet is normally protected from being accessed from the Internet without proper authorization. The Internet is not considered to be a part of the intranet.

For the purposes of the present invention, the term "ionizing radiation" refers to any particulate or electromagnetic radiation that is capable of dissociating atoms into a positively and negatively charged ion pair. The present invention may be used to determine doses of both directly ionizing radiation and indirectly ionizing radiation. Ionizing (or ionising) radiation is radiation composed of particles that individually carry enough kinetic energy to liberate an electron from an atom or molecule, ionizing it. Ionizing radiation is generated through nuclear reactions, either artificial or natural, by very high temperature (e.g., plasma discharge or the corona of the Sun), via production of high energy particles in particle accelerators, or due to acceleration of charged particles by the electromagnetic fields produced by natural processes, from lightning to supernova explosions. When ionizing radiation is emitted by or absorbed by an atom, it can liberate an atomic particle (typically an electron, proton, or neutron, but sometimes an entire nucleus) from the atom. Such an event can alter chemical bonds and produce ions, usually in ion-pairs, that are especially chemically reactive. This greatly magnifies the chemical and biological damage per unit energy of radiation because chemical bonds will be broken in this process. If the atom was inside a crystal lattice in a solid phase, then a "hole" will exist where the original atom was. Ionizing radiation includes cosmic rays, Alpha particles, Beta particles, Gamma rays, X-rays, and in general any charged particle moving at relativistic speeds. Neutrons are considered ionizing radiation at any speed. Ionizing radiation includes some portion of the ultraviolet spectrum, depending on context. Radio waves, microwaves, infrared light, and visible light are normally considered non-ionizing radiation, although very high intensity beams of these radiations can produce sufficient heat to exhibit some similar properties to ionizing radiation, by altering chemical bonds and removing electrons from atoms. Ionizing radiation is ubiquitous in the environment, and comes from naturally occurring radioactive materials and cosmic rays. Common artificial sources are artificially produced radioisotopes, X-ray tubes and particle accelerators. Ionizing radiation is invisible and not directly detectable by human senses, so instruments such as Geiger counters are usually required to detect its presence. In some cases it may lead to secondary emission of visible light upon interaction with matter, such as in Cherenkov radiation and radioluminescence. It has many practical uses in medicine, research, construction, and other areas, but presents a health hazard if used improperly. Exposure to ionizing radiation causes damage to living tissue, and can result in mutation, radiation sickness, cancer, and death.

For the purposes of the present invention, the term "ionizing radiation sensor" refers to a device that measures the presence or activity of a material or substance that emits or generates ionizing radiation.

For the purposes of the present invention, the term "irradiation" refers to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, x-rays, ultraviolet, etc.

For the purposes of the present invention, the term "local area network (LAN)" refers to a network covering a small geographic area, like a home, office, or building.

Current LANs are most likely to be based on Ethernet technology. The cables to the servers are typically on Cat 5e enhanced cable, which will support IEEE 802.3 at 1 Gbit/s. A wireless LAN may exist using a different IEEE protocol, 802.11b, 802.11g or possibly 802.11 In. The defining characteristics of LANs, in contrast to WANs (wide area networks), include their higher data transfer rates, smaller geographic range, and lack of a need for leased telecommunication lines. Current Ethernet or other IEEE 802.3 LAN technologies operate at speeds up to 10 Gbit's.

For the purposes of the current invention, the term "low powered wireless network" refers to an ultra-low powered wireless network between sensor nodes and a centralized device. The ultra-low power is needed by devices that need to operate for extended periods of time from small batteries energy scavenging technology. Examples of low powered wireless networks are ANT, ANT+, Bluetooth Low Energy (BLE), ZigBee and WiFi.

For the purposes of the present invention, the term "MEMS" refers to Micro-Electro-Mechanical Systems. MEMS, is a technology that in its most general form may be defined as miniaturized mechanical and electro-mechanical elements (i.e., devices and structures) that are made using the techniques of microfabrication. The critical physical dimensions of MEMS devices can vary from well below one micron on the lower end of the dimensional spectrum, all the way to several millimeters. Likewise, the types of MEMS devices can vary from relatively simple structures having no moving elements, to extremely complex electromechanical systems with multiple moving elements under the control of integrated microelectronics. A main criterion of MEMS may include that there are at least some elements having some sort of mechanical functionality whether or not these elements can move. The term used to define MEMS varies in different parts of the world. In the United States they are predominantly called MEMS, while in some other parts of the world they are called "Microsystems Technology" or "micromachined devices." While the functional elements of MEMS are miniaturized structures, sensors, actuators, and microelectronics, most notable elements may include microsensors and microactuators. Microsensors and microactuators may be appropriately categorized as "transducers," which are defined as devices that convert energy from one form to another. In the case of microsensors, the device typically converts a measured mechanical signal into an electrical signal.

For the purposes of the present invention the term "mesh networking" refers to a type of networking where each node must not only capture and disseminate its own data, but also serve as a relay for other nodes, that is, it must collaborate to propagate the data in the network. A mesh network can be designed using a flooding technique or a routing technique. When using a routing technique, the message is propagated along a path, by hopping from node to node until the destination is reached. To ensure all its paths' availability, a routing network must allow for continuous connections and reconfiguration around broken or blocked paths, using self-healing algorithms. A mesh network whose nodes are all connected to each other is a fully connected network. Mesh networks can be seen as one type of ad hoc network. Mobile ad hoc networks and mesh networks are therefore closely related, but mobile ad hoc networks also have to deal with the problems introduced by the mobility of the nodes. The self-healing capability enables a routing based network to operate when one node breaks down or a connection goes bad. As a result, the network is typically quite reliable, as there is often more than one path between a source and a destination in the network. Although mostly used in wireless situations, this concept is also applicable to wired networks and software interaction.

For the purposes of the present invention the term "mobile ad hoc network" is a self-configuring infrastructureless network of mobile devices connected by wireless. Ad hoc is Latin and means "for this purpose". Each device in a mobile ad hoc network is free to move independently in any direction, and will therefore change its links to other devices frequently. Each must forward traffic unrelated to its own use, and therefore be a router. The primary challenge in building a mobile ad hoc network is equipping each device to continuously maintain the information required to properly route traffic. Such networks may operate by themselves or may be connected to the larger Internet. Mobile ad hoc networks are a kind of wireless ad hoc networks that usually has a routable networking environment on top of a Link Layer ad hoc network. The growths of laptops and wireless networks have made mobile ad hoc networks a popular research topic since the mid-1990s. Many academic papers evaluate protocols and their abilities, assuming varying degrees of mobility within a bounded space, usually with all nodes within a few hops of each other. Different protocols are then evaluated based on measure such as the packet drop rate, the overhead introduced by the routing protocol, end-to-end packet delays, network throughput etc.

For the purposes of the present invention, the term "network hub" refers to an electronic device that contains multiple ports. When a packet arrives at one port, it is copied to all the ports of the hub for transmission. When the packets are copied, the destination address in the frame does not change to a broadcast address. It does this in a rudimentary way, it simply copies the data to all of the Nodes connected to the hub. This term is also known as hub. The term "Ethernet hub," "active hub," "network hub," "repeater hub," "multiport repeater" or "hub" may also refer to a device for connecting multiple Ethernet devices together and making them act as a single network segment. It has multiple input/output (I/O) ports, in which a signal introduced at the input of any port appears at the output of every port except the original incoming. A hub works at the physical layer (layer 1) of the OSI model. The device is a form of multiport repeater. Repeater hubs also participate in collision detection, forwarding a jam signal to all ports if it detects a collision.

For the purposes of the present invention, the term "radiation attenuating material" refers to a material that reduces the intensity of incident radiation by absorbing some or all of the energy of the radiation within the material.

For the purposes of the present invention, the term "radiation dosimetry" refers to the conventional meaning of the term "radiation dosimetry", i.e., the measurement of the amount of radiation dose absorbed in a material, an object or the body of an individual.

For the purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For the purposes of the present invention, the term "random-access memory (RAM)" refers to a type of computer data storage. Today it takes the form of integrated circuits that allow the stored data to be accessed in any order, i.e. at random. The word random thus refers to the fact that any piece of data can be returned in a constant time, regardless of its physical location and whether or not it is related to the previous piece of data. This contrasts with storage mechanisms such as tapes, magnetic discs and optical discs, which rely on the physical movement of the recording medium or a reading head. In these devices, the movement takes longer than the data transfer, and the retrieval time varies depending on the physical location of the next item. The word RAM is mostly associated with volatile types of memory (such as DRAM memory modules), where the information is lost after the power is switched off. However, many other types of memory are RAM as well, including most types of ROM and a kind of flash memory called NOR-Flash.

For the purposes of the present invention, the term "read-only memory (ROM)" refers to a class of storage media used in computers and other electronic devices. Because data stored in ROM cannot be modified (at least not very quickly or easily), it is mainly used to distribute firmware (software that is very closely tied to specific hardware, and unlikely to require frequent updates). In its strictest sense, ROM refers only to mask ROM (the oldest type of solid state ROM), which is fabricated with the desired data permanently stored in it, and thus can never be modified. However, more modern types such as EPROM and flash EEPROM can be erased and re-programmed multiple times; they are still described as "read-only memory" because the reprogramming process is generally infrequent, comparatively slow, and often does not permit random access writes to individual memory locations.

For the purposes of the present invention, the term "real-time processing" refers to a processing system designed to handle workloads whose state is constantly changing. Real-time processing means that a transaction is processed fast enough for the result to come back and be acted on as transaction events are generated. In the context of a database, real-time databases are databases that are capable of yielding reliable responses in real-time.

For the purposes of the present invention, the term "router" refers to a networking device that forwards data packets between networks using headers and forwarding tables to determine the best path to forward the packets. Routers work at the network layer of the TCP/IP model or layer 3 of the OSI model. Routers also provide interconnectivity between like and unlike media devices. A router is connected to at least two networks, commonly two LANs or WANs or a LAN and its ISP's network.

For the purposes of the present invention, the term "sensor" refers to a collector and/or producer of information and/or data. A sensor can be an instrument or a living organism (e.g. a person). For example, a sensor may be a GPS device, a thermometer, a mobile phone, an individual writing a report, etc. A sensor is an entity capable of observing a phenomenon and returning an observed value. For example, a mercury thermometer converts the measured temperature into expansion and contraction of a liquid which can be read on a calibrated glass tube. A thermocouple converts temperature to an output voltage which can be read by a voltmeter. For accuracy, all sensors are often be calibrated against known standards. A sensor may include a device which detects or measures a physical property and records records, indicates, or responds to that physical property.

For the purposes of the present invention, the term "server" refers to a system (software and suitable computer hardware) that responds to requests across a computer network to provide, or help to provide, a network service. Servers can be run on a dedicated computer, which is also often referred to as "the server," but many networked computers are capable of hosting servers. In many cases, a computer can provide several services and have several servers running. Servers may operate within a client-server architecture and may comprise computer programs running to serve the requests of other programs—the clients. Thus, the server may perform some task on behalf of clients. The clients typically connect to the server through the network but may run on the same computer. In the context of Internet Protocol (IP) networking, a server is a program that operates as a socket listener. Servers often provide essential services across a network, either to private users inside a large organization or to public users via the Internet. Typical computing servers are database server, file server, mail server, print server, web server, gaming server, application server, or some other kind of server. Numerous systems use this client/server networking model including Web sites and email services. An alternative model, peer-to-peer networking may enable all computers to act as either a server or client as needed.

For the purposes of the present invention, the term "solid-state electronics" refers to those circuits or devices built entirely from solid materials and in which the electrons, or other charge carriers, are confined entirely within the solid material. The term is often used to contrast with the earlier technologies of vacuum and gas-discharge tube devices and it is also conventional to exclude electro-mechanical devices (relays, switches, hard drives and other devices with moving parts) from the term solid state. While solid-state can include crystalline, polycrystalline and amorphous solids and refer to electrical conductors, insulators and semiconductors, the building material is most often a crystalline semiconductor. Common solid-state devices include transistors, microprocessor chips, and RAM. A specialized type of RAM called flash RAM is used in flash drives and more recently, solid state drives to replace mechanically rotating magnetic disc hard drives. More recently, the integrated circuit (IC), the light-emitting diode (LED), and the liquid-crystal display (LCD) have evolved as further examples of solid-state devices. In a solid-state component, the current is confined to solid elements and compounds engineered specifically to switch and amplify it.

For the purposes of the present invention, the term "solid state sensor" refers to sensor built entirely from a solid-phase material such that the electrons or other charge carriers produced in response to the measured quantity stay entirely with the solid volume of the detector, as opposed to gas-discharge or electro-mechanical sensors. Pure solid-state sensors have no mobile parts and are distinct from electro-mechanical transducers or actuators in which mechanical motion is created proportional to the measured quantity.

For purposes of the present invention, the term the term "storage medium" refers to any form of storage that may be used to store bits of information. Examples of storage include both volatile and non-volatile memories such as MRRAM, MRRAM, ERAM, flash memory, RFID tags, floppy disks, Zip™ disks, CD-ROM. CD-R, CD-RW, DVD, DVD-R, flash memory, hard disks, optical disks, etc.

For the purposes of the present invention, the term "transmission control protocol (TCP)" refers to one of the core protocols of the Internet Protocol Suite. TCP is so central that the entire suite is often referred to as "TCP/IP." Whereas IP handles lower-level transmissions from computer to computer as a message makes its way across the Internet. TCP operates at a higher level, concerned only with the two end systems, for example a Web browser and a Web server. In particular, TCP provides reliable, ordered delivery of a stream of bytes from one program on one computer to another program on another computer. Besides the Web, other common applications of TCP include e-mail and file transfer. Among its management tasks, TCP controls message size, the rate at which messages are exchanged, and network traffic congestion.

For the purposes of the present invention, the term "time" refers to a component of a measuring system used to sequence events, to compare the durations of events and the intervals between them, and to quantify the motions of objects. Time is considered one of the few fundamental quantities and is used to define quantities such as velocity. An operational definition of time, wherein one says that observing a certain number of repetitions of one or another standard cyclical event (such as the passage of a free-swinging pendulum) constitutes one standard unit such as the second, has a high utility value in the conduct of both advanced experiments and everyday affairs of life. Temporal measurement has occupied scientists and technologists, and was a prime motivation in navigation and astronomy. Periodic events and periodic motion have long served as standards for units of time. Examples include the apparent motion of the sun across the sky, the phases of the moon, the swing of a pendulum, and the beat of a heart. Currently, the international unit of time, the second, is defined in terms of radiation emitted by cesium atoms.

For the purposes of the present invention, the term "timestamp" refers to a sequence of characters, denoting the date and/or time at which a certain event occurred. This data is usually presented in a consistent format, allowing for easy comparison of two different records and tracking progress over time: the practice of recording timestamps in a consistent manner along with the actual data is called timestamping. Timestamps are typically used for logging events, in which case each event in a log is marked with a timestamp. In file systems, timestamp may mean the stored date/time of creation or modification of a file. The International Organization for Standardization (ISO) has defined ISO 8601 which standardizes timestamps.

For the purposes of the present invention, the term "visual display device" or "visual display apparatus" includes any type of visual display device or apparatus such as a CRT monitor, LCD screen, LEDs, a projected display, a printer for printing out an image such as a picture and/or text, etc. A visual display device may be a part of another device such as a computer monitor, television, projector, telephone, cell phone, smartphone, laptop computer, tablet computer, handheld music and/or video player, personal data assistant (PDA), handheld game player, head mounted display, a heads-up display (HUD), a global positioning system (GPS) receiver, automotive navigation system, dashboard, watch, microwave oven, electronic organ, automatic teller machine (ATM) etc.

For the purposes of the present invention, the term "web service" refers to the term defined by the W3C as "a software system designed to support interoperable machine-to-machine interaction over a network". Web services are frequently just web APIs that can be accessed over a network, such as the Internet, and executed on a remote system hosting the requested services. The W3C Web service definition encompasses many different systems, but in common usage the term refers to clients and servers that communicate using XML messages that follow the SOAP standard. In such systems, there is often machine-readable description of the operations offered by the service written in the Web Services Description Language (WSDL). The latter is not a requirement of a SOAP endpoint, but it is a prerequisite for automated client-side code generation in many Java and .NET SOAP frameworks. Some industry organizations, such as the WS-I, mandate both SOAP and WSDL in their definition of a Web service. More recently, RESTful Web services have been regaining popularity. These also meet the W3C definition, and are often better integrated with HTTP than SOAP-based services. They do not require XML messages or WSDL service-API definitions.

For the purposes of the present invention, the term "wide area network (WAN)" refers to a data communications network that covers a relatively broad geographic area (i.e. one city to another and one country to another country) and that often uses transmission facilities provided by common carriers, such as telephone companies. WAN technologies generally function at the lower three layers of the OSI reference model: the physical layer, the data link layer, and the network layer.

For the purposes of the present invention, the term "World Wide Web Consortium (W3C)" refers to the main international standards organization for the World Wide Web (abbreviated WWW or W3). It is arranged as a consortium where member organizations maintain full-time staff for the purpose of working together in the development of standards for the World Wide Web. W3C also engages in education and outreach, develops software and serves as an open forum for discussion about the Web. W3C standards include: CSS, CGI, DOM, GRDDL, HTML, OWL, RDF, SVG, SISR, SOAP, SMIL, SRGS, SSML, VoiceXML, XHTML+Voice, WSDL, XACML, XHTML, XML, XML Events, Xforms. XML Information, Set, XML Schema, Xpath, Xquery and XSLT.

For the purposes of the present invention, the term "ZigBee" refers a specification for a suite of high level communication protocols used to create personal area networks built from small, low-power digital radios. ZigBee is based on an IEEE 802 standard. Though low-powered, ZigBee devices often transmit data over longer distances by passing data through intermediate devices to reach more distant ones, creating a mesh network; i.e., a network with no centralized control or high-power transmitter/receiver able to reach all of the networked devices. The decentralized nature of such wireless ad-hoc networks make them suitable for applications where a central node can't be relied upon. ZigBee may be used in applications that require a low data rate, long battery life, and secure networking. ZigBee has a defined rate of 250 kbit/s, best suited for periodic or intermittent data or a single signal transmission from a sensor or input device. Applications include wireless light switches, electrical meters with in-home-displays, traffic management systems, and other consumer and industrial equipment that requires short-range wireless transfer of data at relatively low rates. The technology defined by the ZigBee specification is intended to be simpler and less expensive than other WPANs, such as Bluetooth® or Wi-Fi. Zigbee networks are secured by 128 bit encryption keys.

DESCRIPTION

In existing passive, integrating radiation monitoring devices, such as film, TLD or OSL sensors, incident radiation is accumulated and stored within the molecular structure of the sensor without any need of electrical power. This characteristic makes passive sensors ideal for situations where the risk of a power interruption is unacceptable. Multiple radiation sensors are generally mounted in a holder containing one or more filters that alter the amounts, energies and types of radiation able to reach the sensors. These filters typically sandwich the sensors to achieve correct assessments when the radiation enters the dosimeter from various angles of incidence. To analyze the sensors, they must be removed from between the filters and the holder and physically presented to the processing system required to elicit the quantitative attribute exhibited by the sensor following exposure to radiation.

Radiation dosimeters based on optically stimulated luminescence (OSL) utilize an optical path whereby a stimulating beam of light can illuminate the OSL sensor(s) and the resultant radiation induced luminescence can be routed back through the same or alternate optical path to a light detector such as a photomultiplier tube that quantifies the amount of luminescent light. For more information on OSL materials and systems, see, U.S. Pat. No. 5,731,590 issued to Miller; U.S. Pat. No. 6,846,434 issued to Akselrod; U.S. Pat. No. 6,198.108 issued to Schweitzer et al.; U.S. Pat. No. 6,127,685 issued to Yoder et al.; U.S. patent application Ser. No. 10/768, 094 filed by Akselrod et al.; all of which are incorporated herein by reference in their entireties. See also Optically Stimulated Luminescence Dosimetry. Lars Botter-Jensen et al., Eleservier, 2003; Klemic, G., Bailey, P., Miller, K., Monetti, M. External radiation dosimetry in the aftermath of radiological terrorist event, Rad. Prot. Dosim., in press; Akselrod, M. S., Kortov, V. S., and Gorelova, E. A., Preparation and properties of Al2O3:C, Radiat. Prot. Dosim. 47, 159-164 (1993); and Akselrod, M. S., Lucas, A. C., Polf. J. C., McKeever, S. W. S. Optically stimulated luminescence of Al2O3:C, Radiation Measurements, 29, (3-4), 391-399 (1998), all of which are incorporated herein by reference in their entireties.

The present invention provides a new apparatus and system consisting of multiple sensor devices (including one or more passive, integrating electronic radiation sensors, a MEMS accelerometer, a wireless transmitter and, optionally, a GPS, a thermistor, or other chemical, biological or EMF sensors) and computer algorithms and programs for calculating the dose from the event (e.g., the personal dose equivalent), and for the simultaneous detection and wireless transmission of ionizing radiation, motion and global position for use in occupational and environmental dosimetry. The present invention is a new embodiment of existing sensors in a unique new product using new processes and algorithms to create a self-contained, passive, integrating dosimeter that constructs a unique record of event intensity, location, time of the event, temperature and other specialized sensor data such as biological or chemical measurements.

Accordingly, aspects of the disclosed invention provide the use of MEMS and nanotechnology manufacturing techniques to encapsulate individual ionizing radiation sensor elements within a radiation attenuating material that provides a "filtration bubble" around the sensor element, the use of multiple attenuating materials (filters) around multiple sensor elements, and the use of a software algorithm to discriminate between different types of ionizing radiation and different radiation energy.

As shown in FIG. 1, an exemplary sensor array 100 comprising MEMS and nanotechnology manufacturing techniques are employed to create a configuration of encapsulating radiation attenuating material around respective nanoscale radiation sensors. As illustrated, a plurality of ionizing radiation sensors 102 are provided and configurable, for example, to be integrated on electronic chip circuitry, as discussed below. Ionizing radiation sensors 102 may include solid state sensor technology including a detecting surface 114 of the sensor.

Ionizing radiation sensors 102 may be arranged into sensor arrays 204 (FIG. 2) comprising one or more radiation sensors 102 and mounted on a printed circuit board (PCB), for example, as described below.

FIG. 1 illustrates a first sensor 104 encapsulated, for example, in a filter material such as a specific radiation attenuating material 108 or a "filtration bubble" 110 having, for example, a prescribed thickness. Up to "n" sensors 106 may be manufactured and encapsulated in up to "n" different respective filtration bubbles 112, where each filtration bubble can consist of a similar or different materials or similar or different material thicknesses. In this example, filtration bubble 108 corresponds to sensor 106 such that sensor 106 is surrounded or encapsulated by filtration bubble 108. In some preferred embodiments, the filtration bubble may comprise a spherical geometry. Materials of the filtration bubble may include thin metallic layers including, for example, copper, tin, aluminum, tungsten, etc. The filtration bubble will characteristically be comprised of radiation attenuating material(s) capable of filtering out, for example, alpha particles and beta radiation. Filter material such as specific radiation attenuating material 108 or a "filtration bubble" provides an optimal angular response wherein the response of the sensor is independent of the angle of incidence of the radiation (or other measured quantity), i.e., the output of sensor 106 is the same (or "flat") at all angles.

Additional aspects of the disclosed invention provide the use of MEMS and nanotechnology sensors to simultaneously detect motion, global position, radiation exposure, and a process, such as the use of a software algorithm, to correlate radiation exposure levels over time with motion of the detector and with the global position of the detector. Accordingly, features of disclosed embodiments enable, at least, the following advantages: (1) providing the correlation of radiation exposure levels with time, motion and global position of the detector to provide unique and valuable information on how the exposure occurred: (2) allowing the global position to detect either via an on-board GPS sensor or by a connected external electrical device, such as a mobile smart device (e.g., smartphone), with a built-in GPS sensor or by estimation from a mesh of networked devices; (3) providing enablement such that the time, motion and global position can be optionally recorded when the detected exposure exceeds a threshold level.

Figure 2:
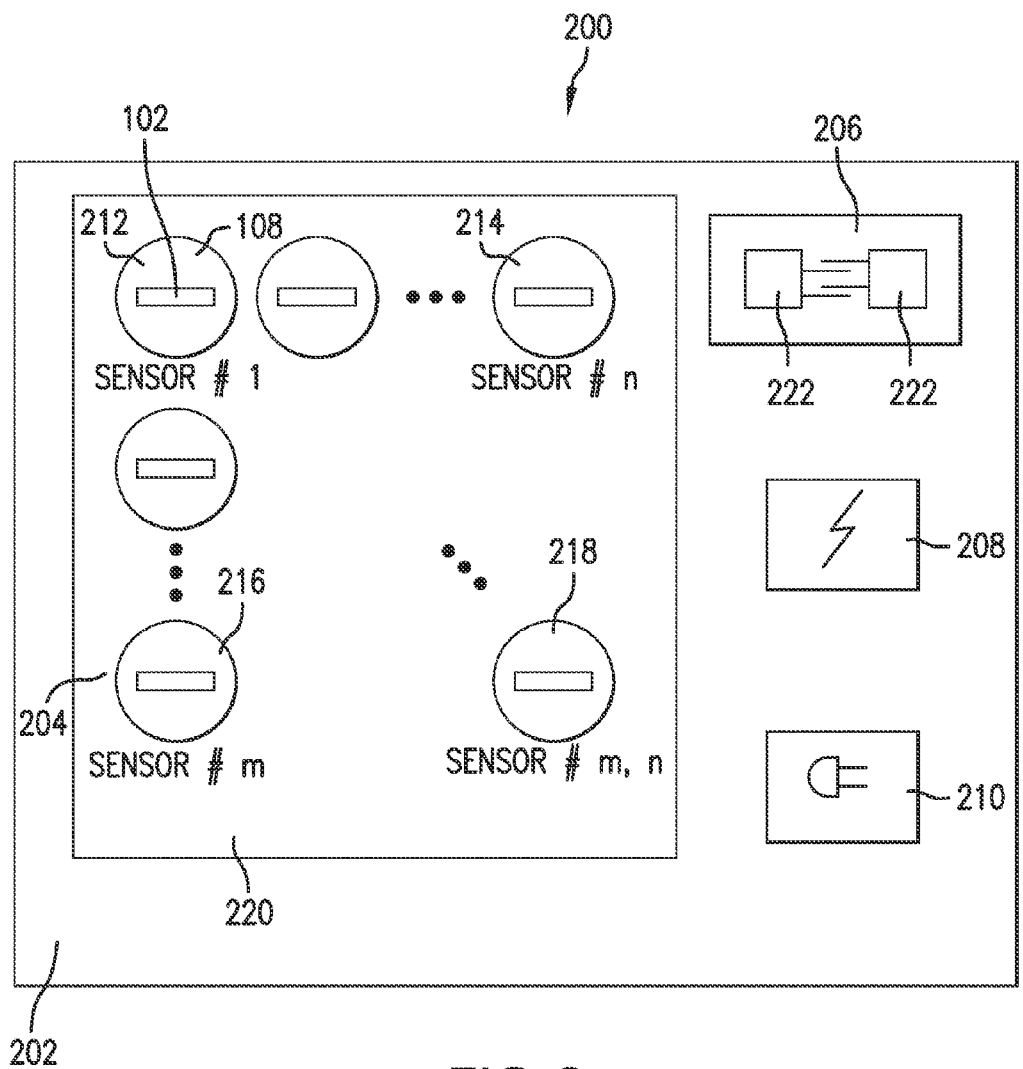
FIG. 2 illustrates an integrated sensor module according to an exemplary embodiment of the present invention.

Hardware components of the disclosed invention are further illustrated in FIG. 2 wherein modular sensors are integrated on a single chip or electronic board 202 (e.g., PCB) thus forming an integrated sensor module 200. Integrated sensor module 200 collects radiation data and is configured to ultimately transmit the data to a remote location such as a wireless base station or other wireless communications device. The integrated sensor module 200 is designed to be an independent sensor system that can be incorporated into many different form factor devices. The small size and self-contained nature of the integrated sensor module 200 to be integrated into a wide range of devices such as a badge, nametag, key chain, bracelet, wrist watch, portable electronic device, MP3 Player, pager, cell phone, smartphone, laptop, tablet, glasses, article of clothing, wallet, purse or jewelry.

The primary sensor 220 can either be a single sensor, a linear array of sensors, or a matrix of sensors to form the primary or modular sensor array 204, for example employed from the sensor array 100 of FIG. 1. Thus the modular sensor array 204 may utilize only a first sensor #1 (212). Alternatively, modular sensor array 204 may comprise n number of rows such as from first sensor #1 (212) to sensor #n (214). Alternatively and/or in addition, modular sensor array 204 may include m number of columns such as from first sensor #1 (212) to sensor #m (216). Thus, having n number of rows and m number of columns, modular sensor array 204 would extend from first sensor #1 (212) to sensor #m, n (218).

While ionizing radiation sensors 102 encapsulated within "filtration bubbles" 108 are shown for illustrative purposes, those skilled in the art will readily appreciate that the modular sensor array 220 may consist of other suitable types of sensors (e.g., for non-ionizing radiation, hazardous chemicals, or other biochemical substances). Alternative embodiments of the disclosed invention may also include chemical or other sensors in addition and/or as an alternative to ionizing radiation sensor 102. The present invention describes an integrated modular sensor 200 that provides unique information about the location and the motion of the sensor when a measurement is obtained. The modular nature of the described platform and device enables the use of other individual sensors or as variable combination of sensors chosen to meet the needs of potential end users. The modularity is achieved by developing the measurement devices as interchangeable modules that can be coupled to a central processing unit (CPU) that handles the collection of time, motion, position and temperature and the communication.

The primary sensor array 220 may be integrated with a motion and global position sensor package The motion and global position sensor package 206 will consist of a single 3-axis MEMS based accelerometer 222 that will determine if a primary data exposure occurs while the device is stationary or in motion as measured on a continual basis. A primary data exposure is a radiological event recorded by the primary sensor array 220. The motion and global position sensor package 206 will consist of a global position radio 223 that will determine its position by either the on-board GPS radio 223 and/or by a connected wireless-enabled mobile device (e.g., smart phone or tablet with GPS sensing capability, etc.) or by estimation through a mesh of networked devices. To minimize power consumption of the primary power source the device will preferentially determine location through GPS sensors with the lowest power means available to it. First by the connected wireless-enabled mobile device with GPS capability, second by onboard GPS sensor and third by estimation through a mesh of networked devices.

A wireless system on a chip (SOC) module 208 is configured to integrated sensor module 200. The wireless SOC module 208 is an integrated package consisting of a central processing unit and the wireless transceiver. Combining the wireless transceiver into the CPU chip in a SOC configuration allows a reduction in footprint and energy consumption. The wireless system on a chip (SOC) module 208 permits wireless transmission from integrated sensor module 200, for example, to a wireless receiver of another electronic device for electronic communication purpose(s). Such communications ability facilitates efforts, for example, in determining whether integrated sensor module 200 is within range of the aforementioned electronic device as further discussed below.

The present invention uses energy harvesting through micro mechanical systems (MEMS) and photovoltaic systems to recharge the internal battery and extend the powered lifetime of the integrated sensor module 200. Embodiments of the disclosed invention also extend previous work using the MEMS devices of the integrated sensor module 200 to convert resonant and vibrational mechanical motion into electrical energy and photovoltaic cells to convert ambient lighting into electrical energy. The present invention uses MEMS to convert the random mechanical energy of human motion into electrical energy, and photovoltaics to convert ambient light into electrical energy, both of which can be stored in a battery on the device and later used to power the above-described sensors of the integrated sensor module 200. MEMS based energy harvesting can be accomplished with piezoelectric, electrostatic or magneto-static devices. Piezoelectric energy harvesters convert mechanical strain of vibration in electrical energy. Electrostatic energy harvesters collect energy from the changing capacitance of vibrating separation of charged parallel plate capacitors. Magneto-static energy harvesters collect energy through the motion of a magnet near an electric coil, such that the changing magnetic field of the moving magnet induces current flow in the electric coil. Photovoltaic energy harvesters are based on solar cells that convert solar or ambient indoor light into electric current. The power harvester 210 will consist of one or more energy harvesting devices. A power harvester 210 is incorporated into the integrated sensor module 200 and connected to the battery. Power harvester 210 collects energy via motion and/or movement of the integrated sensor module 200 and the ambient light to recharge the battery that supplies power to electronic board 202. Thus, the present invention will actively consume power as it operates and actively communicates to external wireless enabled devices. Power harvester 210 leverages existing work within the MEMS devices to convert periodic (resonant) vibrational mechanical motion into electrical energy to extend the battery that powers the runtime of the radiation measurement sensor capability of the integrated sensor module 200.

Through extensive historical data on the dose levels of personal monitoring radiation detectors it has been determined that 95% of users receive normal occupational level doses. By optionally collecting motion and position only when the detected exposure exceeds a preset threshold. The power consumption of the device can be greatly reduced. The combination of primary exposure data, time, motion and location creates a unique data set which may provide information about the location of radiation fields and the motion of the users through those fields.

Embodiments of the disclosed invention enable the use of ultra-low-power wireless transmission to transmit measured sensor readings from the sensor device 202 to a wireless-enabled mobile device (e.g., a smartphone or tablet device, etc.), and the transmission of this information over a wired or wireless data network to an Internet-based server.

The uniquely configured electronic modular configuration of the disclosed invention provides several advantages. The filter material is machine pressed into a spherical shape, and the resulting "filtration bubble" 110 is mechanically pressed into the circuit board containing the ionizing radiation sensor elements 102. Disclosed embodiments of the invention will enact a unique software algorithm (as detailed below) to enable the discrimination between different types of ionizing radiation and different radiation energies. This enables a unique customization of the energy discrimination filtration scheme to improve the accuracy and energy resolution of ionizing radiation measurements using a passive radiation detector.

Radiation attenuating materials 108 are used to modify the response of non-tissue equivalent sensors to allow varying responses to a wide range of radiation qualities. The modified response can then be used by an algorithm to derive the tissue equivalent dose. Currently macro-filters utilized in convention sensor devices have several shortcomings that limit the effectiveness of algorithms by introducing uncontrolled variances. The use of MEMS and nanotechnology manufacturing process to encapsulate the radiation sensors with "filtration bubble" 110 provides several advantages over the traditional macro-filters that will help eliminate the uncontrolled variances. The use of precise MEMS and nanotechnology manufacturing processes allows for the elimination of macro scale variances in the separation of the filter, thickness of the filter and location of the filter. The filtration bubble 110 will eliminate macro scale issues with angular dependence of the filtration. The filtration bubble 110 will also provide a protective layer over the sensitive and possibly fragile sensor 102. The use of multiple attenuating materials 108 around multiple sensors 102 with the use of a software algorithm will allow increased levels of fine discrimination between types of ionizing radiation and radiation energy.

Additional advantages of the described embodiments of the present invention utilize MEMS and nanotechnology sensors to simultaneously detect radiation and other exposure, temperature, time, motion and global position, in combination with an employed software algorithm to correlate exposure levels. Detection occurs with the time, motion and global position of the integrated sensor module 200 wherein the chip 200 provides unique and valuable information on how the exposure occurred. The use of modular exposure sensors enables the detection and analysis of exposure to a wide range of phenomena including, for example, radiological, chemical, biological and electromagnetic sources of exposure. The use of time, motion and position further enables the determination of whether the integrated sensor module 200 was moving during an exposure event (e.g., static versus dynamic exposures), and when and where the exposure occurred. The present invention replaces the computationally intensive and time-consuming post-processing and analysis that is currently used by convention sensor devices to determine static versus dynamic exposures. The present invention also provides new time, position and other information that can may be used to accurately characterize the source and nature of the exposure. This capability may be particularly important/useful in occupational dosimetry. The inclusion of a temperature sensor is disclosed embodiments enables correction of measurements for temperature-based variance.

Figure 3:
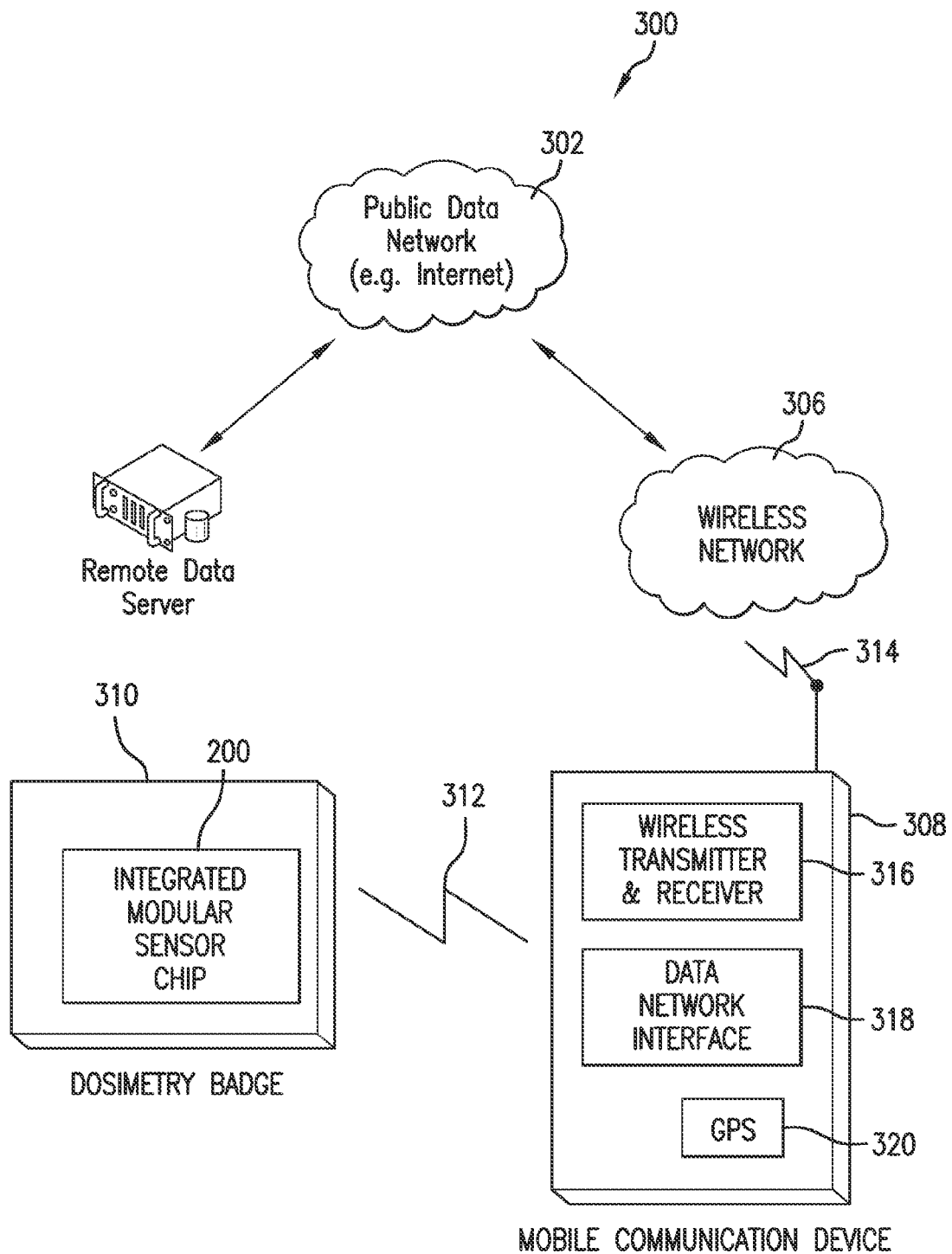
FIG. 3 illustrates a remote sensor network according to an exemplary embodiment of the present invention.

Furthermore, the present invention expands the capabilities and application of traditional, standalone dosimeters by allowing collected data to be transmitted to a central location for processing and redistribution as shown in FIG. 3. FIG. 3 illustrates a remote sensor network 300 according to an exemplary embodiment of the invention. Integrated sensor module 200 is integrated into a dosimetry badge 310. Dosimetry badge 310 is illustrated as a package, for example, including the disclosed electronics packaging including integrated sensor module 200, batteries and a cover of the present invention. Integrated sensor module 200 collects radiation data and ultimately transmits the data to a remote location such as a wireless base station or other wireless communications device such as mobile communications device 308. A remote sensor chip of integrated sensor module 200 may be utilized to transmit the data. In this case, the data may be transmitted via an unspecified wireless transmission communication protocol 312 such as Bluetooth®, ZigBee, ANT, or other standard Wi-Fi protocol, etc.

Examples of mobile communication device 308 may include, for example, a smart phone, tablet or a mobile hotspot, or it might be a non-mobile network device such as a dedicated base station. Mobile communication device 308 may be configured to include a wireless transmitter and receiver 316, data network interface 318, and GPS 320. Wireless system on a chip (SOC) module 208 of integrated sensor module 200 is configured to communicate with wireless transmitter and receiver 316. The wireless transmitter and receiver may be a low powered wireless network interface for the mobile communication device 308. The network interface allows the mobile communication device 308 to communicate with the integrated modular wireless sensor chip 200 to download collected data. The aforementioned communication facilitates the determination of whether mobile communication device 308 is in range of integrated sensor module 200.

Mobile communication device 308 may also be configured to include a data network interface 318. The data network interface 318 allows mobile communication device 308 to communicate to another wide area wireless network 306 such as via data network transmission communication protocol 314. Examples of data network transmission communication protocol 314 may include Wifi, GSM/EDGE, CDMA, UTMS/HSPA+, LTE or other high speed wireless data communication network. Thus, in an exemplary embodiment, Bluetooth® may be employed to communicate between the dosimetry badge 310 and mobile communication device 308 (such as via wireless transmission communication protocol 312), and the use of LTE to communicate between mobile communication device 308 and wireless network 306 (such as via data network transmission communication protocol 314) of a remote facility such as a hospital or laboratory. In this example, the local network may be represented by wireless network 306 and the public network may be indicated by as public data network 302. By communicating, for example, over the public data network 302, the aforementioned remote facility, such as a hospital or laboratory, may reach, access and/or process information deposited on distributed data server 804.

GPS 320 enables mobile communication device 308 to determine the position of the radiological event. The GPS 320 radio in the mobile communication device 308 provides an alternative means of the determining the position of the integrated sensor module 200. If the integrated sensor module 200 has been paired with a mobile communication device 308, it will preferentially use GPS sensor 320 to determine location to minimize its own power consumption.

Wireless network 306 is configured to communicate with the public data network (e.g., the Internet) 302. A remote data server 304 is configured to communicate with a public data network (e.g., the Internet) 302.

With an electronic data transmission link formed between mobile communication device 308 and remote data server 304, integrated sensor module 200 is capable of transmitting measured data such as to an ultra-low-power wireless-enabled mobile communication device 308 (e.g., a smart phone, tablet or other mobile or non-mobile network device) to leverage the mobile device's existing data or cellular network to communicate collected information to a central web server and, optionally, to use the mobile communication device GPS, or to process the collected data using the mobile communication device CPU. Currently, standalone sensor devices have limited power capacity that must be conserved as much as possible in order to extend battery life. Ultra-low-power wireless communication minimizes the power consumption of device for regular updates. Furthermore, typical data or cellular communication antennas can consume significant power, so utilizing an external mobile communication device also limits the complexity of radiation sensor.

Thus, the use of ultra-low-power wireless transmission capability of the present invention allows transmission of measured sensor readings from integrated sensor module 200 to a wireless-enabled mobile device 308 (e.g., a smartphone or tablet device, etc.), and the transmission of this information over a wireless data network 306 to an Internet-based server 302. This enables the analysis and reporting of measured doses for individual detectors employing integrated sensor module 200 without having to physically send the detector itself to a central location for reading and analysis. The reduces costs and valuable time for receiving data and performing critical analysis. Embodiments of the present invention also allow for multiple systems to receive a plurality of measured doses from a plurality of detectors having integrated sensor module 200. The collection of sensor data from multiple systems enables the analysis and visualization and geographic-based mapping of exposure sources and related population-based trends over time. The connection to the Internet also enables the remote update and troubleshooting of the device.

Disclosed embodiments of the present invention may include mounting the integrated sensor module 200, for example, on multiple, low-cost, semi-autonomous unmanned airborne vehicles (UAV's) such as low-power RF helicopters. A flocking-algorithm may be employed to cause the "flock" of devices to track the position and distribution of airborne radiation, chemicals or other phenomena while remaining in the flock and where the distribution of the flock would correlate with the distribution of the airborne material being tracked.

Figure 4:
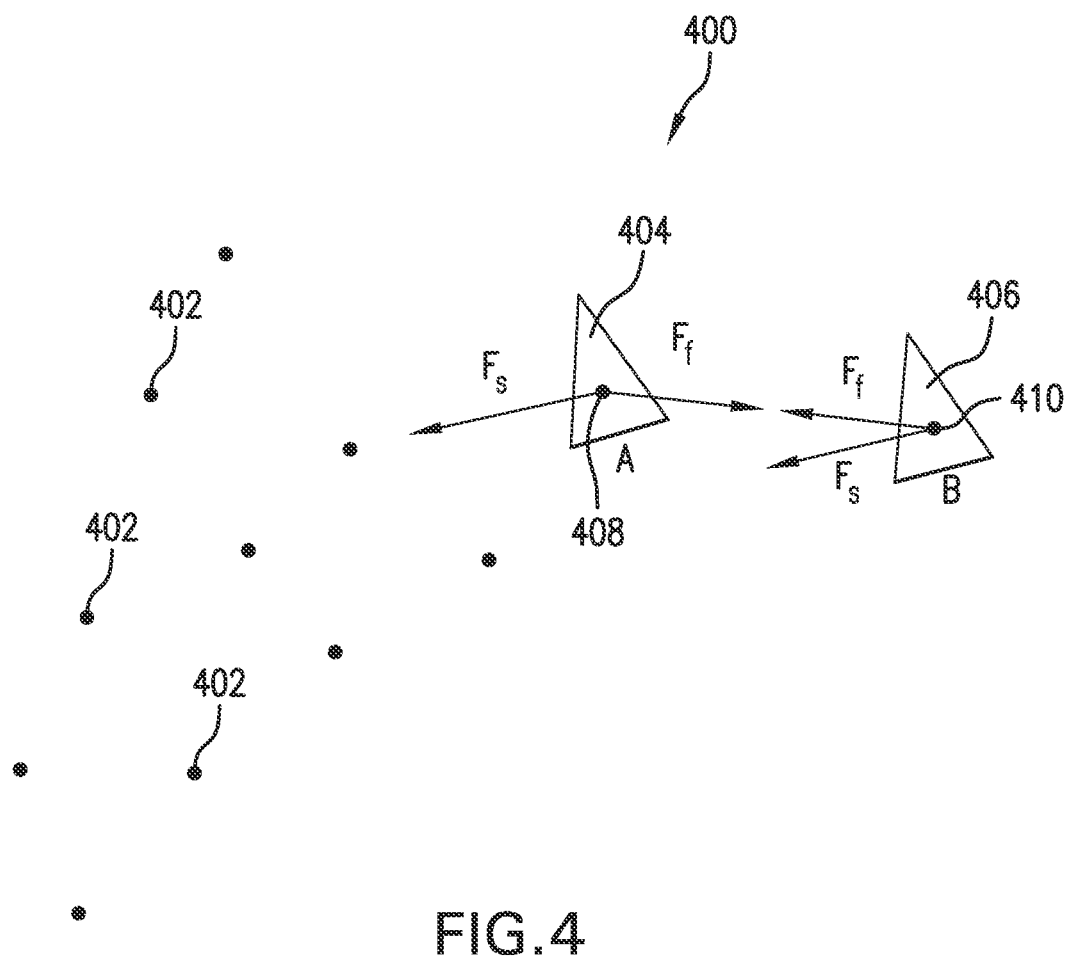
FIG. 4 illustrates an autonomous mobile sensor (AMS) network according to an exemplary embodiment of the present invention.

Thus, in select embodiments, the disclosed invention enables the integration of the integrated sensor module 200 into a mobile platform that may consist of multiple semi-autonomous UAV's to track the position and distribution of airborne materials (radiation, chemicals, biological agents, electromagnetic fields, etc.). The UAV-integrated sensors may utilize flocking algorithms to coordinate between multiple UAV's and track the position and distribution of airborne particles. Turning to FIG. 4 an exemplary autonomous mobile sensor (AMS) network 400 is illustrated. As shown in FIG. 4, the airborne (or waterborne) particles 402 will tend to cluster and then distribute depending, for example, upon prevailing weather patterns. Autonomous mobile sensors (AMS) 404, 406 are shown tracking respective distributed target particles 408, 410. The flocking algorithm will update the position of all UAVs 404, 406 by using a Sensor Force, Fs, proportional to the measurement from the sensor array 204 on the UAV, and a Flocking Force, Ff, proportional to the distance to nearby UAV's, to continually optimize the positions of the UAV sensors 404, 406 and to best track the position of the target particles 408, 410. As a result, the distribution of the flock will also correlate with the distribution of the airborne material being tracked.

In another embodiment the disclosed invention may include mounting integrated sensor module 200 on multiple, low-cost, semi-autonomous and unmanned water-based vehicles and tracking, for example, waterborne particles. Again, the use of the previously described flocking-algorithm may be employed to coordinate between multiple unmanned water-based vehicles and to track the position and distribution of any water-based radiation, chemicals or other phenomena.

Advantages of the disclosed invention provide the first use of MEMS and nanotechnology to create a passive integrating electronic ionizing radiation detector with active readout capability and with motion-sensing and position-sensing capabilities and wireless transmission of the sensor readings. Current active dosimeters require continuous power in order to measure dose. Additionally, current passive dosimeters do not provide immediate access to recorded dose measurements. Alternatively, the active readout of a passive radiation sensor disclosed by the present invention provides immediate access to dose information while preserving dose information in the event of power loss. In addition, the present invention describes an electronic platform for recording motion, temperature and position with modular environmental sensors for comprehensive personal and environmental monitoring.

An exemplary integrated sensor module logic flow 500 for integrated sensor module 200 is represented in FIG. 5. A command 502 for reading the sensor is executed. Command 502 includes pre-reading a high-sensitivity sensor 504 to determine if there is a new threshold dose 506 on the sensor.

In determining whether there is a new threshold dose 506 on the sensor, the sensor is enabled to continuously accumulate dose values. When a pre-read is performed on the high-sensitivity sensor, a cumulative value is generated. The previous dose value is subtracted from the cumulative value generated from the pre-read to generate a delta (Δ) value. If the delta (Δ) value above a prescribed dose threshold, then a trigger measurement is taken in step 508. If the delta (Δ) value is not above the prescribed dose threshold then a loopback function is performed to take continuous measurements at a timed interval to read the sensor 502. Described embodiments continuously loop back to pre-read high-sensitivity sensor 504 until a delta (Δ) dose value is detected to be higher than the prescribed dose threshold value. Once a delta (Δ) dose value is detected to be higher than the prescribed dose threshold value, a trigger measurement 508 is enabled to simultaneously read a solid-state sensor array 510 (also see FIG. 6) and read-out of the event data or point of exposure in time 512 (also see FIG. 7).

One disclosed embodiment of the sensor readout logic flow diagram is illustrated in FIG. 6. The solid-state sensor array read-out 600 is the component of the disclosed invention that reads the entire sensor array. A reading from the high sensitivity sensor indicates that the minimum incremental dose threshold has been reached. The high sensitivity sensor is solely intended to indicate when the threshold dose has been exceeded. Once the threshold dose has been exceeded the full dose will be read. The full dose can be read from a 1-D array, a 2-D array or a 3-D matrix. A 1-D array may just be a row of sensors. A 2-D array may be a table of sensors or a matrix of sensors. A 3-D array would be if you stack up multiple 2-D arrays. We can have multiple ways of reading this out. We could either read each sensor individually 602, or we might read-out along an entire row or column of sensors 604, or we might sum up the output from all of the sensors 606, or you could readout a custom configuration (e.g., four of the sensors in each quadrant if there was an array of multiple sensors (e.g., sixteen sensors). Hence, disclosed embodiments of the described invention provide multiple ways of reading a solid-state sensor array.

One disclosed embodiment of the sensor readout logic flow diagram is illustrated in FIG. 6. The solid-state sensor array read-out 600 is the component of the disclosed invention that reads the entire sensor array. In one example, the high sensitivity sensor may be affixed to a badge. In an event where the badge is exposed to ionizing radiation the disclosed invention can read out the full dose of exposure. Disclosed embodiments provide the ability to read individual, a whole array of sensors, and a custom configuration of sensors. Accordingly, for various configurations of sensors, the invention may generate readings, for example, for individual sensors 602 such as a one-dimensional array including, for example, a row of sensors. In addition to or alternatively, dimensional arrays of sensors may be read by disclosed embodiments to include, for example, a table of sensors or a matrix of sensors. Such embodiments of sensor configurations may include a two-dimensional array of sensors including, for example, one or more rows or one or more columns of sensors. Disclosed embodiments may also provide a three-dimensional array, for example, including one or more two-dimensional arrays stacked upon one another. Thus, disclosed embodiments may either read sensors individually 602, perform a two-dimensional read-out, for example, along an entire row or column of sensors 604, or perform a sum of all of the output from all of the sensors 606, or perform a readout for a custom configuration of sensors (e.g., four of the sensors in each quadrant if there was an array of multiple sensors (e.g., sixteen sensors)). Hence, disclosed embodiments of the described invention provide multiple ways of reading a solid-state sensor array.

Disclosed embodiments provide electronic sensing circuitry to generate an analog measurement. The analog measurement is preferably converted to a digital measure utilizing standard analog to digital conversion circuitry 610. From the digital data, the dose 612 is calculated by implementing an algorithm of the disclosed invention for calculating the dose on a system on a chip (SOC) (e.g., via an arm processor). The calculated dose value is then recorded on a data record 614 which may essentially generate a log of all of the readings on a continuous basis.

In parallel with the solid-state sensor array read-out 600 of FIG. 6, the disclosed invention executes a read-out of the event data or point of exposure in time 512. The point of exposure read-out logic flow 700 is illustrated in FIG. 7 and may be executed via parallel circuitry. An on-board MEMS accelerometer device 702 is read to determine if the sensor is in motion. Next, the position of the sensor is estimated 704. This may be accomplished, for example, by reading the GPS sensor on the integrated sensor module or by communicating with a mobile device (e.g., cell phone) in which the GPS function of the mobile device is utilized to determine the geospatial position. The GPS receiver of the mobile device determines position by precisely timing the signals sent by GPS satellites. Each satellite continually transmits messages that include the time the message was transmitted and the satellite position at the time of message transmission. The GPS receiver uses the messages it receives to determine the transit time of each message and computes the distance to each satellite using the speed of light. Each of these distances and satellites' locations define a sphere. The receiver is on the surface of each of these spheres when the distances and the satellites' locations are correct. These distances and satellites' locations are used to compute the location of the receiver using navigation equations. In another embodiment, the position may be estimated by triangulating the position such as from a known wireless hub with which the sensor is communicating. Wireless triangulation is the process of determining a location of a point by measuring signal strength between several nodes of the wireless network. A time stamp is generated 706 to record the time at which a measurement was taken. This measure correlates to the motion (e.g., point at which on-board MEMS accelerometer device is read 702) and position (e.g., the estimated position of the sensor 704) at the time the sensor was read. The time stamp readings 706 may then be exported or recorded to the data log. Thus, the exposure event is captured in the data record 708.

Figure 5:
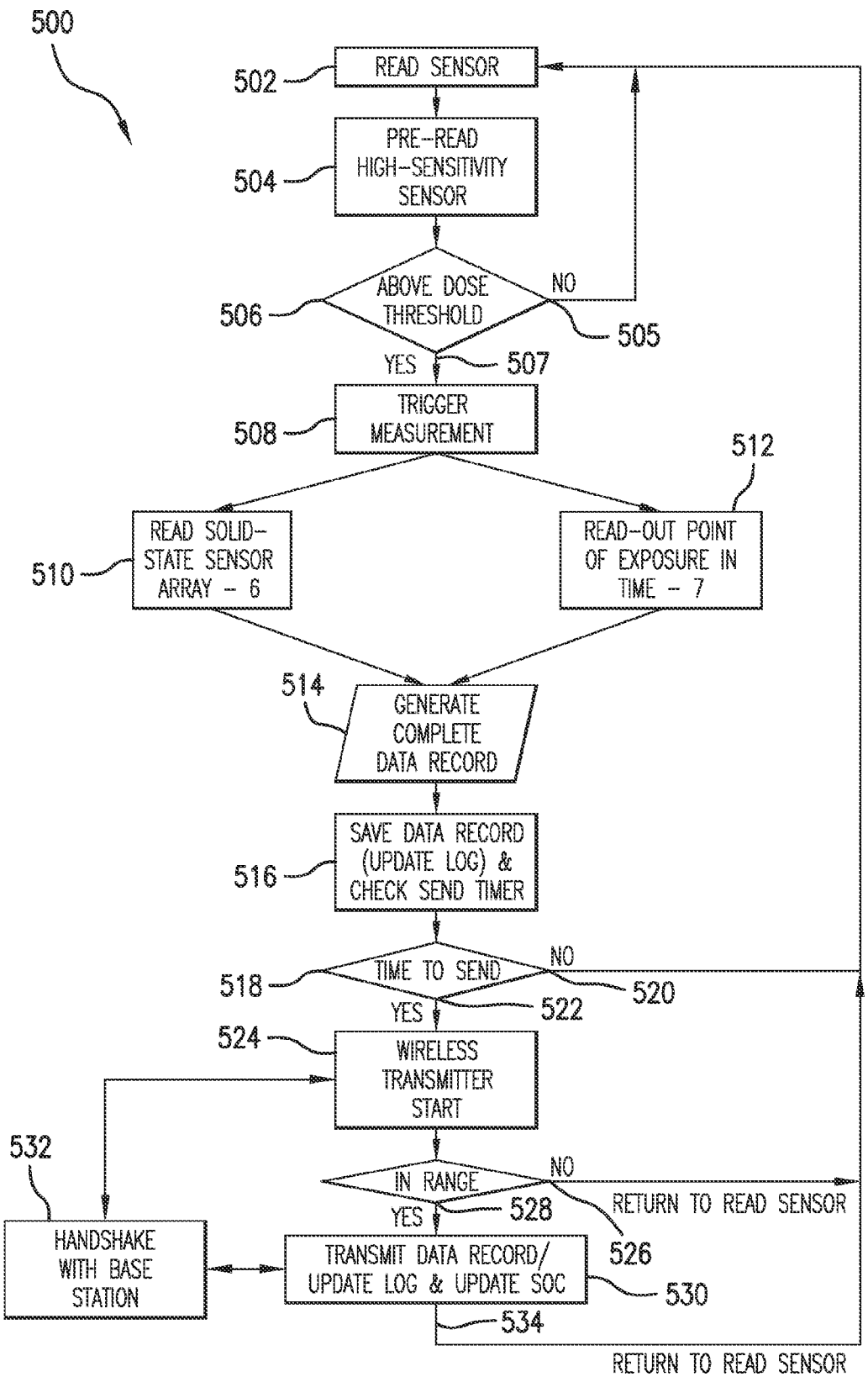
FIG. 5 illustrates an integrated sensor module logic flow according to an exemplary embodiment of the present invention.

Turning again to FIG. 5, the above description outlines the generation of a dose value 510 and a point of exposure in time 512 in the log or recorded data records 614 and 708, respectively, to generate a complete data record 514. The complete data record 514 is saved or updated to the record log and the Send Timer is checked 516. The Send Timer determines when data should be uploaded to the base station 802 or mobile communication device 308 based on a programmable Time To Send value. For example, if the dose exceeds a prescribed threshold value or if the prescribed time has elapsed, then the dose value is transmitted and recorded 522. If the Time to Send value has not been reached, then the device will return to reading 520.

The wireless transmission is started 524 in order to initiate sending a signal from the sensor wireless transmitter 208 of the integrated sensor module 200, for example, to wireless receiver 316 of mobile communication device 308. The sensor's wireless transmitter 208 looks for a handshake response from the wireless transmitter 316 of the mobile communications device 308 to determine if the device is in range for further communication. Sensor wireless transmitter 208 of the integrated sensor module 200 can be configured to communicate with another electronic communications device, such as base station 802, to determine if it is within range of the electronic communications device. If a receiver is within range and a response is received, then the operation continues 528. If a determination is made that the sensor is not in range, then a determination of "no" is made 526 and the operation returns to read the sensor 502 again. When a determination is made that the sensor is in range, a determination of "yes" is made 528, and the data record is transmitted such that the log is updated to show that the data record has been transmitted 530 and to record that the system has been updated. A continuous, never-ending number of readings may occur or as needed in the integrated sensor module logic flow 500.

Figure 8:
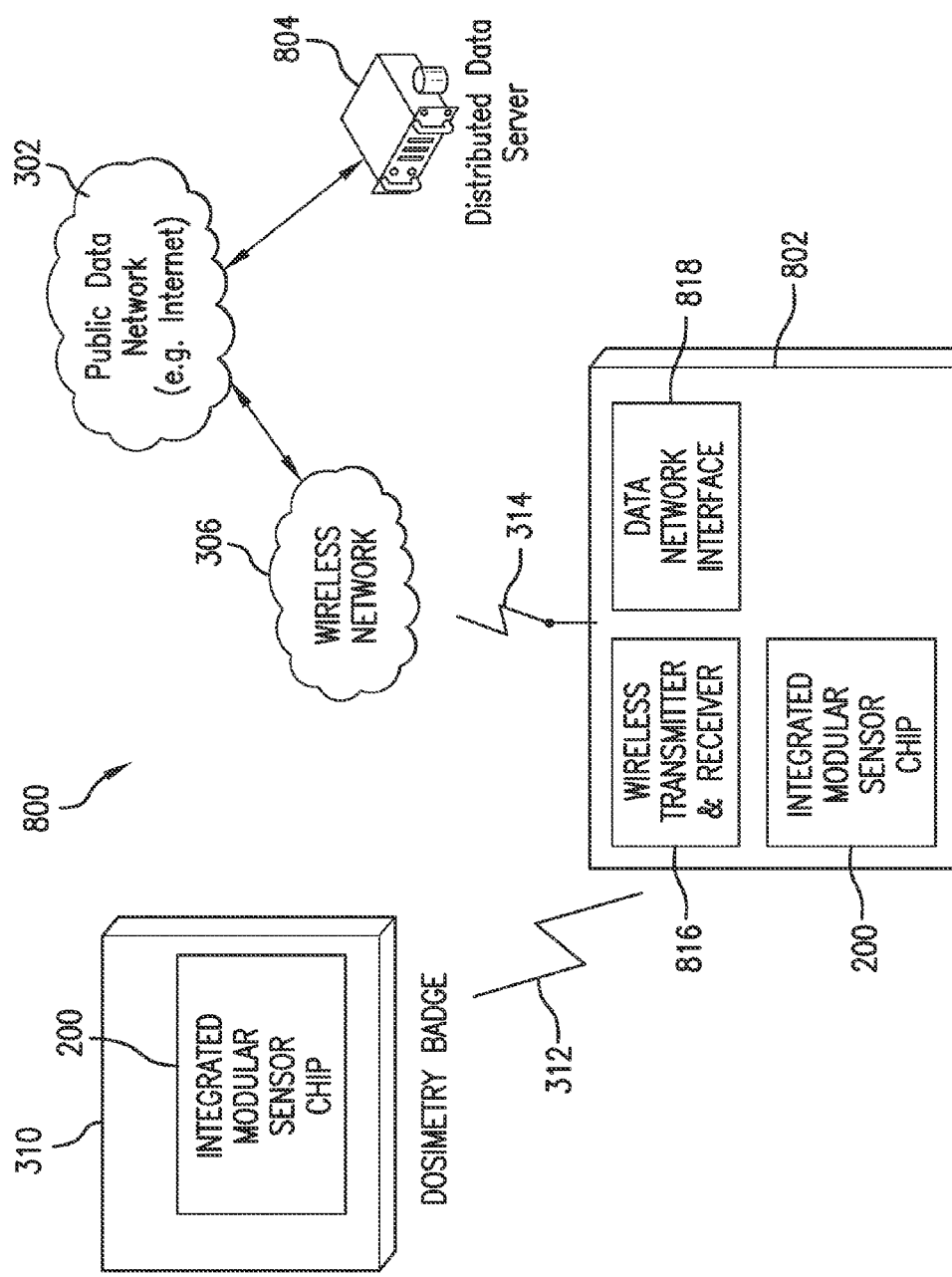
FIG. 8 illustrates a wireless sensor base station configuration according to an exemplary embodiment of the present invention.

FIG. 8 illustrates an exemplary embodiment of the disclosed invention in communication with a wireless sensor base station configuration 800. One or more generalized data servers can be connected to a public data network, such as the Internet, to provide an event repository wherein all of the event data is stored in one or more databases accessible over the Internet, and wherein further data analysis can be performed. The Internet is sometimes referred to The Cloud, and access to data over The Cloud for further analysis is sometimes referred to as Cloud Computing.

Figure 6:
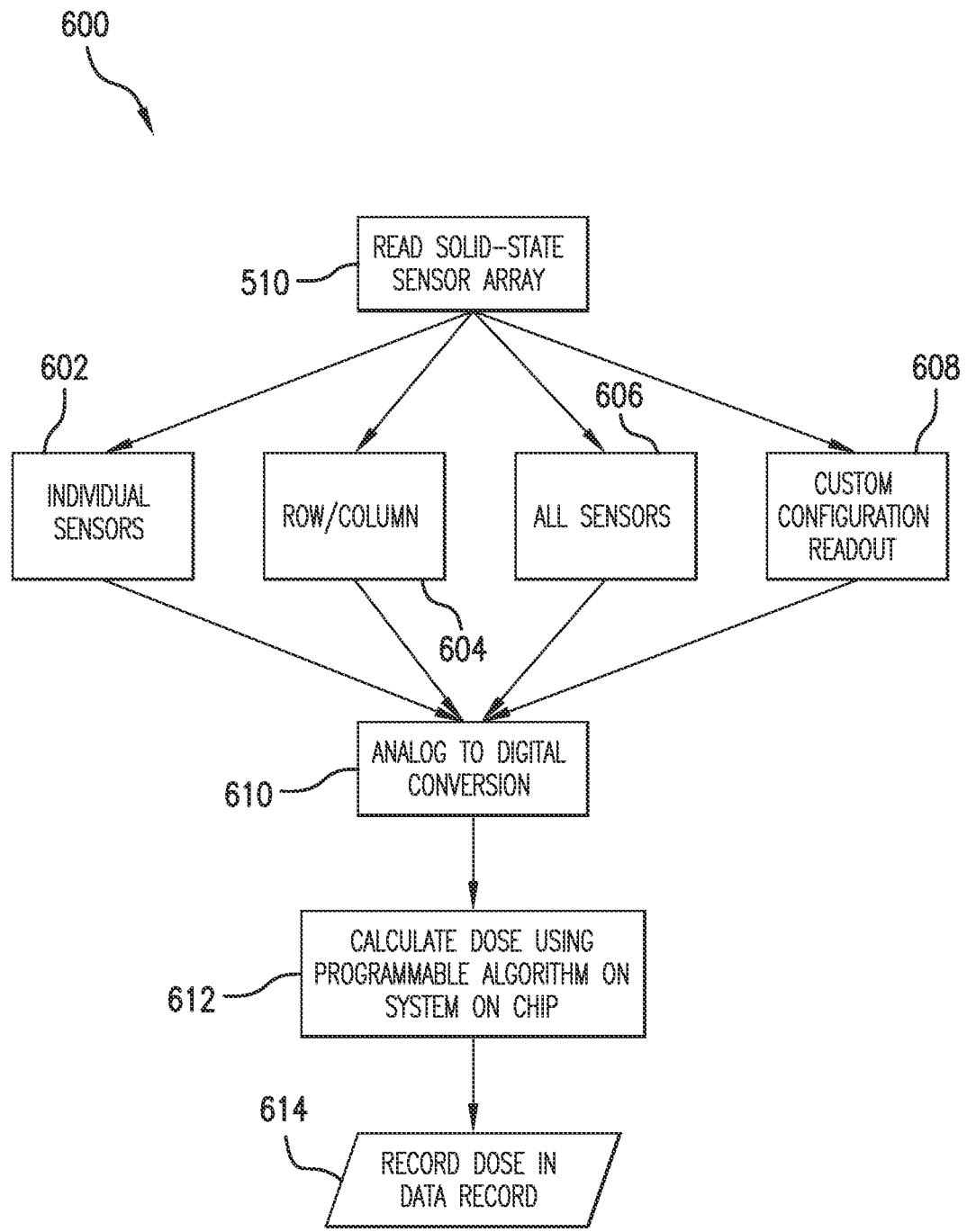
FIG. 6 illustrates a sensor readout logic flow according to an exemplary embodiment of the present invention.
Figure 7:
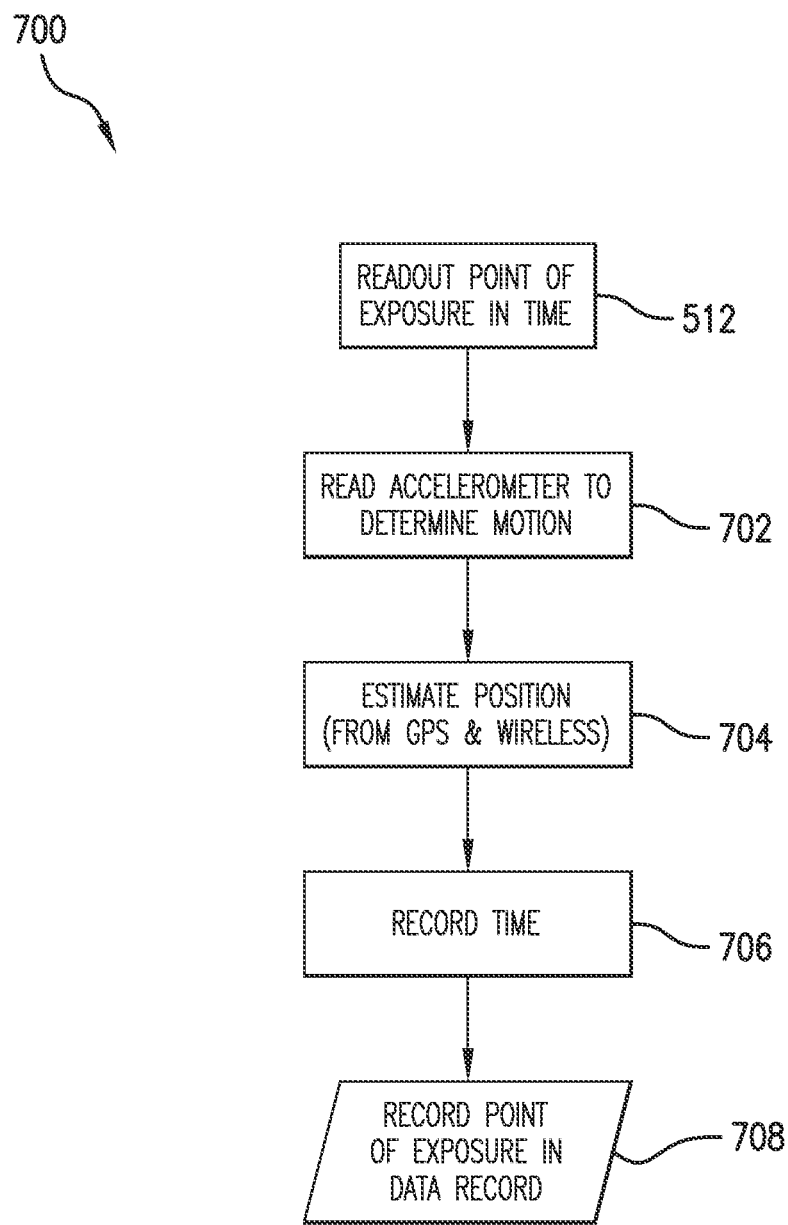
FIG. 7 illustrates a point of exposure readout logic flow according to an exemplary embodiment of the present invention.

Dosimetry badge 310 is illustrated as a package containing, for example, the disclosed electronics packaging including integrated sensor module 200, batteries and a cover of the present invention. Using the algorithm (FIGS. 6 and 7), the integrated sensor module 200 is configured to transmit data to a wireless communications device such as a wireless sensor base station 802. Dosimetry badge 310 may communicate with wireless sensor base station 802 via an unspecified wireless transmission communication protocol including, for example, Bluetooth®, Bluetooth Low Energy (BLE), ZigBee, ANT, ANT+ or other standard wireless communications protocols.

Wireless sensor base station 802 includes a wireless transmitter and receiver 816. Wireless system on a chip (SOC) module 208 of integrated sensor module 200 communicates with wireless transmitter and receiver 816 to determine whether base station 802 is in range of integrated sensor module 200 as discussed, for example, in step 532 of FIG. 5 above. Wireless sensor base station 802 may also include a data network interface 818. Data network interface 818 allows wireless sensor base station 802 to communicate to another wireless network such as via data network transmission communication protocol 314. Thus, in an exemplary embodiment, Bluetooth® Low Energy (BLE) may be employed to communicate between the dosimetry badge 310 and wireless sensor base station 802 (such as via wireless transmission communication protocol 312), and Wi-Fi may be employed to communicate between wireless sensor base station 802 and wireless network 306 (such as via data network transmission communication protocol 314) of a remote facility such as a hospital or laboratory. In this example, the local network may be represented by wireless network 306 and the public network may be indicated by as public data network 302. By communicating, for example, over the public data network 302, the aforementioned remote facility, such as a hospital or laboratory, may reach, access and/or process information deposited on distributed data server 804.

In an optional configuration, wireless sensor base station 802 may include integrated sensor module 200. This configuration enables wireless sensor base station 802 as an event sensing device as well, acting, for example, as an environmental sensor.

As previously discussed, disclosed embodiments of the invention will employ a unique software algorithm to enable the discrimination between different types of ionizing radiation and different radiation energies. This enables a unique customization of the energy discrimination filtration scheme to improve the accuracy and energy resolution of ionizing radiation measurements using a passive radiation detector. Disclosed embodiments provide electronic sensing circuitry to generate an analog measurement. The analog measurement is preferably converted to a digital measure utilizing standard analog to digital conversion circuitry 610. From the digital data, the dose 612 is calculated by implementing the algorithm of the disclosed invention for calculating the dose on a system on a chip (SOC) (e.g., via an arm processor). Select embodiments may employ, for example, a machine readable medium having stored thereon sequences of instructions, which when executed by one or more processors, cause one or more electronic devices to perform a set of operations to perform the aforementioned algorithm. The calculated dose value is then recorded on a data record 614 which may essentially generate a log of all of the readings on a continuous basis.

Accordingly, an embodiment of the invention provides a numerically optimized dose calculation algorithm for accurate and reliable personal dosimetry. Disclosed embodiments provided a computational procedure to generate numerically optimized dose calculation algorithms for personal dosimeters using multiple dosimeter elements (typically two-to-four elements). Current embodiments provide a description of how methods of the present invention transforms dosimeter signals to operational quantities for personal dose equivalents such as Hp(10), Hp(3), and Hp(0.07). Some advantages of the computational procedure of the disclosed invention include the ability to automatically generate a numerically optimized algorithm, the absence of branching or empirical decision points, and fast computation speed.

The accurate and reliable measurement of a personal dose equivalent is a key component of radiation dosimetry programs. The personal dose equivalent is typically measured over a wide range of energies and from different radiation sources, including, for example, x-ray and gamma photons, beta particles and neutrons. In order to accurately estimate the dose from different radiation sources, some personal dosimeters incorporate multiple detector elements, each with varying types of radiation filtration materials, and use a dose calculation algorithm, to calculate the personal dose equivalent from a numerical combination of the responses from each detector element.

One approach to calculate the dose is to use a simple linear combination of detector element responses. Such approaches are straight-forward and easy to implement, but may be highly sensitive to noise and often do not reliably provide an accurate estimate of the dose under realistic conditions. Another approach is to use empirically-determined branching and decision points. According to exemplary embodiments, this approach is relatively easy to implement, and improves performance under some conditions, but the empirical decisions are unique to specific conditions, and often subject to systematic biases. Techniques for applying both linear combination and branching methods to radiation dosimetry have been developed, for example, by N. Stanford (e.g., see N. Stanford, Whole Body Dose Algorithm for the Landauer InLight Next Generation Dosimeter. Algorithm Revision: Next Gen IEC; Sep. 13, 2010 and N. Stanford, Whole Body Dose Algorithm for the Landauer InLight Next Generation Dosimeter, Algorithm Revision: Next Gen NVLAP; Sep. 27, 2010).

The present invention provides MATRIX i.e., a computational procedure to automatically generate a dose calculation algorithm that is numerically optimized for a particular dosimeter type (i.e., a particular combination of dosimeter detector elements and filters). In order to minimize systematic bias the disclosed embodiment, i.e., MATRIX calculates a weighted average from representative data, such that no one irradiation field, detector or ratio of detector signals dominates the resultant dose. The following describes the computational procedure used to generate a numerically-optimized dose calculation algorithm for a personal dosimeter using a matrix of element responses obtained from measurements of that type of dosimeter.

Given a personal dosimeter consisting, for example, of multiple filtered detector elements, the detected signal from each detector element is called the element response, and the array of element responses from a given dosimeter is called the detector's element response pattern. For a given type of dosimeter, the matrix resulting from multiple detector element responses at different but known irradiations is called the element response matrix.

The element response matrix is created by exposing a dosimeter to known irradiations at different angles and to mixtures of individual or multiple sources, and then reading the element responses from each detector element. The element response pattern from an unknown irradiated dosimeter is then compared to the patterns in the element response matrix, and a dose is calculated for each source in the response matrix. The final reported dose is the sum of all the individual source doses weighted by a Source Probability Factor. The Source Probability Factor is a measure of how closely the element response pattern of the unknown dosimeter matches the individual element response pattern of known sources.

The steps in the disclosed embodiment, i.e., MATRIX computational procedure 900 are summarized in Table 1 of FIG. 9, and each computational procedure is described in the corresponding sections below.

In step 902, the dosimeter element responses and the corresponding dosimeter response matrix for that type of dosimeter are input, and then the converted values are calculated. For dosimeters employing optically simulated luminescence (OSL) such as LANDAUER's InLight4) dosimeters, the dosimeter element responses correspond to the photomultiplier counts from the InLight® Reader. The convened values are calculated from the PMT counts as shown in Equation 1:

$$ConV_n = \frac{PMT\ Counts_n}{Sonsit \times Reader\_Cal\_Factor}$$

The response matrix corresponding to the dosimeter type may be read from computer storage. In one disclosed example, e.g., for LANDAUER InLight® dosimeters, the response matrix contains entries (variables) describing the source, the individual element responses, the deep dose equivalent (DDE) conversion factor, and the standard deviations of the responses.

The response matrix selection may be based on empirically derived rules. In order to achieve optimal performance in a certain application, the range of sources in the response matrix is restricted. This technique may cause a systematic error if radiation conditions occur outside the selected range. An implementation of the disclosed embodiment using selection cuts is described, for example, in Brahim Moreno, LDR-Europe Technical Report on a Hybrid MATRIX-Branching dose calculation algorithm, 2013.

Next a dose calculation may be performed. Given a set of measured converted values, the first step is to calculate G1-4 for each field in the response matrix. Note that the values of G for a given field indicate what the SDE would be if the given field matched the actual incident field to the dosimeter.

The expected value of the SDE for a given field could be taken as the simple average of G over the detector elements. This however would be insufficient due to the fact that for some incident radiation fields, several detectors may have signals with high levels of uncertainty. This turns out to be the case with 85Kr β-rays incident upon detectors with filtration over 0.1 g/cc in density thickness. Because of this field is weakly penetrating, the signals received from the filtered elements are too low relative to the noise level to use them to calculate dose.

A way to calculate dose using only detectors with a good signal is to weight the signal of each detector by a factor inversely proportional to the expected uncertainty and then perform a weighted average over the detectors. The first set is to define the expected uncertainty. Assume that each response matrix entry is determined from data for which the counting statistics were negligible (high dose). This error is a combination of the uncertainties due to the irradiation, reading, handling, and material variability. This combined error is computed as the standard deviation of the data used to generate the response matrix, it is symbolized by $\sigma$.

The expected value of the SDE for field j is given by $\overline{G_j}$. The total uncertainty for the ith detector element and jth radiation field is by symbolized by $\sigma_{ij}$.

$$\overline{G}_l = \frac{\sum_{i=1}^{4} \frac{G_{ij}}{\sigma_{ij}^2}}{\sum_{i=1}^{4} \frac{1}{\sigma_{ij}^2}} \quad (2)$$

A goodness of fit statistic for a single radiation field, j, is given in Equation 3.

$$s_j = \sqrt{\sum_{i=1}^{4} \left(\frac{G_{ij} - \overline{G}_j}{\sigma_{ij}\overline{G}_j}\right)^2} \quad (3)$$

The weighting factor for field j is given in Equation 4.

$$w_j = \frac{1}{(e^{s_l} - 1)^2} \quad (4)$$

Now that a weighting factor has been assigned to each field in the response matrix, the reported SDE value, Grep, is calculated. This is done by taking the weighted sum of the expected values for each radiation field $\overline{G}_j$, over the entire response matrix. This is given in Equation 5, where the sum is performed over a response matrix of N fields.

$$G_{rep} = \frac{\sum_{j=1}^{N} W_j \overline{G}_j}{\sum_{j=1}^{N} W_j} \quad (5)$$

The quantification of similarity between the response pattern of a measured set of converted values and the fields in the response matrix can be derived using any optimization technique. Equations 3-4 are based on the $\chi^2$ minimization. The source specific statistic and weighting factor are an empirical measure of how well the pattern of a set of measured converted values matches the patterns found in the response matrix.

In step 904, a check for error conditions is performed. In this step, common error conditions are checked and, if detected, the appropriate error conditions are set. The dose is not reported if a serious error condition is detected.

In step 906, dose values are calculated for each source in the response matrix. In this step, a weighted value for Hp(0.07) and Hp(10) are calculated for each element to form the response pattern for this dosimeter. Then a goodness of fit statistic is calculated, and then a source weighting factor is determined.

In step 908, disclosed embodiments calculate the total reportable doses. In this step, the weighted values for Hp(0.07) and Hp(10) for each element are summed, then the source weighting factors for each element are summed. The reportable Hp(0.07) and Hp(10) doses are calculated.

In step 910, an estimate of the most likely source of radiation is performed. In this step, the probable contribution of each source in the response matrix is estimated. In the currently disclosed algorithm, the probable contribution of photons and beta particles is estimated.

In step 912, the final (net) dose values are calculated. In this step, the net dose is calculated by subtracting a control dose from the previously calculated dose. Only net doses greater than 1.0 mrem are reported.

In step 914, the net dose values are outputted, e.g., from memory to storage device. In this step, the net dose is assigned to a specific dosimeter using the unique identification value stored in the dosimeter information database. The calculated Net Dose in computer memory is stored in the database (or exported to an external data file if needed. The results can be formatted to allow the generation of dose-of-record customer dose reports as required by local, national or international regulations.

Figure 10:
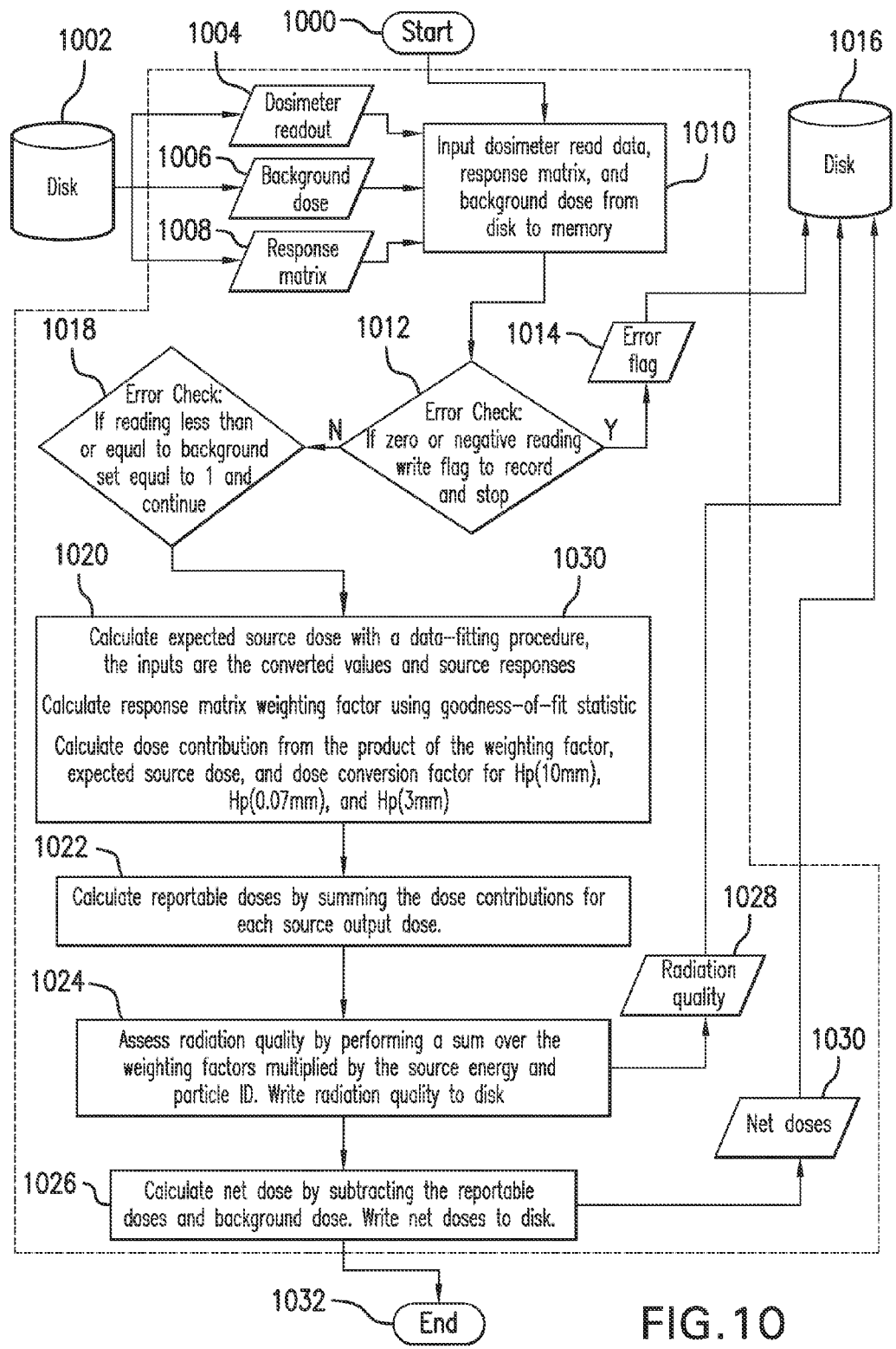
FIG. 10 illustrates a flowchart of the disclosed computational procedure for employing an algorithm according to an exemplary embodiment of the present invention.

A flowchart 1000 of the disclosed computational procedure for employing an algorithm to generate numerically optimized radiation dose calculations for personal dosimeters is illustrated in FIG. 10. Information/data from the dosimeter readout 1004, background radiation dose 1006 and response matric 1008 may be read and inputted from a computer storage 1002 such as a computer disk and stored to a machine readable medium such as memory 1010. The machine readable medium or memory 1010 may have stored thereon sequences of instructions, which when executed, for example, by one or more processors, may cause one or more electronic devices to perform a set of operations to perform the disclosed computer algorithm. The disclosed computer algorithm processes the raw data (e.g., dosimeter readout 1004, background dose 1006, and response matrix 1008) and transforms it to useful information which may be further written to a computer storage 1016 such as a computer disk where the information may be configured to be displayed as needed.

After the raw data is received to memory 1010, disclosed embodiments check for error conditions 1012. Common error conditions are checked and, if detected, the error may be flagged 1014 and all errors may be tracked/tabulated on computer storage 1016. If there is no error 1018, the raw data is processed by the disclosed computer algorithm 1020. Computer algorithm 1020 begins by applying a mathematical algorithm using prescribed numerical procedures to optimize the response matrix. This may include calculating the expected source dose with a data-fitting procedure. The inputs are the converted values and source responses. The response matrix weighting factor may be calculated using a goodness-of-fit statistic. The weighting factors tell you how much each source contributes to the final dose. An optimization technique may be selected based upon prescribed performance criteria. The Dose contribution may be calculated from the product of the weighting factor, expected source does, and dose conversion factor for personal dose equivalent (e.g., Hp(10 mm), Hp (0.07 mm), and Hp (3 mm)).

Once the optimal fit is found/determined, the reportable doses are calculated 1022 by summing the dose contributions for each source output dose. Radiation quality is assessed 1024 by performing a sum over the weighting factors multiplied by the source energy and particle identification. The radiation quality may be written to computer storage 1028 such as to computer disk 1016. The net dose is calculated by subtracting the reportable doses and background dose. The net doses may be written to computer storage 1030 such as to computer disk 1016.

The devices and subsystems of the disclosed exemplary embodiments can store information relating to various processes described herein. This information can be stored in one or more memories, such as a hard disk, optical disk, magneto-optical disk, RAM, and the like, of the devices and subsystems of the disclosed exemplary embodiments. One or more databases of the devices and subsystems of the disclosed exemplary embodiments can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the disclosed exemplary embodiments can include appropriate data structures for storing data collected and/or generated by the processes of the devices and subsystems of the disclosed exemplary embodiments in one or more databases thereof.

All or a portion of the devices and subsystems of the disclosed exemplary embodiments can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the disclosed exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the disclosed exemplary embodiments, for driving the devices and subsystems of the disclosed exemplary embodiments, for enabling the devices and subsystems of the disclosed exemplary embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the disclosed exemplary embodiments. Computer code devices of the exemplary embodiments of the present invention can include any suitable interpretable or executable code mechanism, including but not limited to scripts, interpretable programs, dynamic link libraries (DLLs). Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the disclosed exemplary embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention has been disclosed with references to certain embodiments, numerous modifications, alterations, and changes to the described embodiments are possible without departing from the spirit and scope of the present invention, as defined in the appended claims. Accordingly, it is intended that the present invention not be limited to the described embodiments, but that it has the full scope defined by the language of the following claims, and equivalents thereof.

What is claimed is:

1. An integrated sensor module comprising:
   a radiation sensor array;
   an on-board motion sensor;
   an on-board geospatial positioning sensor;
   an on-board power harvester;
   an on-board wireless transmitter; and
   an on-board temperature sensor,
   wherein the radiation sensor array comprises one or more radiation sensors;
   wherein each of the one or more radiation sensors is surrounded by a filter material to provide an optimal angular response to radiation detected by each of the one or more radiation sensors; and
   wherein the optimal angular response of each of the one or more radiation sensors is independent of the angle of incidence of the radiation detected by each of the one or more radiation sensors.

2. The device of claim 1, wherein the radiation sensor array comprises ionizing radiation sensors.

3. The device of claim 1, wherein the radiation sensor array comprises non-ionizing radiation sensors, hazardous chemical sensors, or other biochemical substance sensors.

4. The device of claim 1, wherein the on-board wireless transmitter is configured to transmit data via an unspecified wireless transmission communication protocol.

5. The device of claim 1, wherein the integrated sensor module is integrated into a dosimetry badge.

6. The device of claim 1, wherein the integrated sensor module is integrated into unmanned airborne vehicles (UAV's).

7. The device of claim 6, wherein the integrated sensor module employs a flocking algorithm to coordinate between multiple UAV's and track the position and distribution of materials.

8. The device of claim 1, wherein the integrated sensor module is integrated into unmanned water-based vehicles.

9. The device of claim 8, wherein the integrated modular sensor architecture employs a flocking algorithm to coordinate between multiple unmanned water-based vehicles and track the position and distribution of materials.

10. An autonomous mobile sensor network for tracking a position and distribution of materials comprising:
    an integrated sensor module comprising:
      a radiation sensor array;
      an on-board motion sensor;

an on-board geospatial positioning sensor;
an on-board power harvester;
an on-board wireless transmitter; and
an on-board temperature sensor,
wherein the radiation sensor array comprises one or more radiation sensors;
wherein each of the one or more radiation sensors is surrounded by a filter material to provide an optimal angular response to radiation detected by each of the one or more radiation sensors;
wherein the optimal angular response of each of the one or more radiation sensors is independent of the angle of incidence of the radiation detected by each of the one or more radiation sensors;
a communication device;
a wireless network;
a public data network; and
a remote data server, wherein the communication device is configured to communicate with the integrated sensor module and the wireless network; wherein the wireless network is also configured to communicate with the public data network; and wherein the public data network is also configured to communicate with the remote data server.

11. The device of claim 10, wherein the radiation sensor array comprises ionizing radiation sensors.

12. The device of claim 10, wherein the radiation sensor array comprises non-ionizing radiation sensors, hazardous chemical sensors, or other biochemical substance sensors.

13. The device of claim 10, wherein the on-board wireless transmitter is configured to transmit data via an unspecified wireless transmission communication protocol.

14. The device of claim 10, wherein the materials include at least one of radiation, chemicals, biological agents, or electromagnetic fields.

15. The device of claim 10, wherein the materials are airborne.

16. The device of claim 10, wherein the materials are waterborne.

17. The device of claim 10, wherein the integrated sensor module is integrated into a dosimetry badge.

18. The device of claim 10, wherein the communication between the communication device and the integrated sensor module occurs via an unspecified wireless transmission communication protocol.

19. The device of claim 10, wherein the communication between the communication device and the wireless network occurs via data network transmission communication protocol.

20. The device of claim 10, wherein the communication between the wireless network and the public data network occurs via the Internet.

21. The device of claim 10, wherein the communication between the public data network and the remote data server occurs via the Internet.

22. An autonomous mobile wireless sensor base station network for tracking a position and distribution of materials comprising:
an integrated sensor module comprising:
a radiation sensor array;
an on-board motion sensor;
an on-board geospatial positioning sensor;
an on-board power harvester;
an on-board wireless transmitter; and
an on-board temperature sensor,
wherein the radiation sensor array comprises one or more radiation sensors;
wherein each of the one or more radiation sensors is surrounded by a filter material to provide an optimal angular response to radiation detected by each of the one or more radiation sensors;
wherein the optimal angular response of each of the one or more radiation sensors is independent of the angle of incidence of the radiation detected by each of the one or more radiation sensors;
a wireless sensor base station;
a wireless network;
a public data network; and
a distributed data server, wherein the wireless sensor base station is configured to communicate with the integrated sensor module and the wireless network; wherein the wireless network is also configured to communicate with the public data network; and wherein the public data network is also configured to communicate with the distributed data server.

23. The device of claim 22, wherein the radiation sensor array comprises ionizing radiation sensors.

24. The device of claim 22, wherein the radiation sensor array comprises non-ionizing radiation sensors, hazardous chemical sensors, or other biochemical substance sensors.

25. The device of claim 22, wherein the on-board wireless transmitter is configured to transmit data via an unspecified wireless transmission communication protocol.

26. The device of claim 22, wherein the materials include at least one of radiation, chemicals, biological agents, or electromagnetic fields.

27. The device of claim 22, wherein the materials are airborne.

28. The device of claim 22, wherein the materials are waterborne.

29. The device of claim 22, wherein the integrated sensor module is integrated into a dosimetry badge.

30. The device of claim 22, wherein the wireless sensor base station comprises:
a wireless transmitter and receiver;
a data network interface; and
a second integrated sensor module comprising:
a radiation sensor array;
an on-board motion sensor;
an on-board geospatial positioning sensor;
an on-board power harvester;
an on-board wireless transmitter; and
an on-board temperature sensor.

31. The device of claim 22, wherein the communication between the wireless sensor base station and the integrated sensor module occurs via an unspecified wireless transmission communication protocol.

32. The device of claim 22, wherein the communication between the wireless sensor base station and the wireless network occurs via data network transmission communication protocol.

33. The device of claim 22 wherein the communication between the wireless network and the public data network occurs via the Internet.

34. The device of claim 22, wherein the communication between the public data network and the distributed data server occurs via the Internet.

* * * * *